(12) United States Patent
Schmidt et al.

(10) Patent No.: US 11,039,623 B2
(45) Date of Patent: Jun. 22, 2021

(54) ARTHROPOD CONTROL FORMULATIONS AND METHODS

(71) Applicant: TyraTech, Inc., Morrisville, NC (US)

(72) Inventors: Jason Schmidt, Cary, NC (US);
Tanner Stanfield, Raleigh, NC (US);
John Owens, Morrisville, NC (US);
Christopher Knox, Raleigh, NC (US)

(73) Assignee: TYRATECH, INC., Morrisville, NC (US)

( * ) Notice: Subject to any disclaimer, the term of this patent is extended or adjusted under 35 U.S.C. 154(b) by 0 days.

(21) Appl. No.: 15/642,706

(22) Filed: Jul. 6, 2017

(65) Prior Publication Data

US 2018/0035674 A1 Feb. 8, 2018

Related U.S. Application Data

(60) Provisional application No. 62/370,749, filed on Aug. 4, 2016.

(51) Int. Cl.
| | |
|---|---|
| *A01N 65/22* | (2009.01) |
| *A01N 25/18* | (2006.01) |
| *A01N 31/02* | (2006.01) |
| *A01N 37/02* | (2006.01) |
| *A01N 49/00* | (2006.01) |
| *A01N 59/00* | (2006.01) |

(52) U.S. Cl.
CPC ............ *A01N 65/22* (2013.01); *A01N 25/18* (2013.01); *A01N 31/02* (2013.01); *A01N 37/02* (2013.01); *A01N 49/00* (2013.01); *A01N 59/00* (2013.01)

(58) Field of Classification Search
CPC ........ A01N 65/22; A01N 25/18; A01N 31/02; A01N 37/02; A01N 49/00; A01N 59/00
See application file for complete search history.

(56) References Cited

U.S. PATENT DOCUMENTS

| | | | |
|---|---|---|---|
| 7,541,155 B2 | 6/2009 | Enan | |
| 7,622,269 B2 | 11/2009 | Enan | |
| 8,501,247 B2 | 8/2013 | Enan et al. | |
| 8,507,013 B2 | 8/2013 | Enan | |
| 8,685,471 B2 | 4/2014 | Enan | |
| 8,691,256 B2 | 4/2014 | Enan | |
| 8,734,869 B2 | 5/2014 | Enan | |
| 8,865,230 B2 | 10/2014 | Enan | |
| 9,492,490 B1 | 11/2016 | Enan | |
| 10,595,529 B1 | 3/2020 | Enan | |
| 2005/0244445 A1 * | 11/2005 | Anderson | A01N 37/02 424/405 |
| 2006/0263403 A1 | 11/2006 | Enan | |
| 2008/0047312 A1 | 2/2008 | Hill et al. | |
| 2008/0075796 A1 | 3/2008 | Enan | |
| 2008/0145462 A1 | 6/2008 | Enan | |
| 2009/0099135 A1 | 4/2009 | Enan | |
| 2009/0232918 A1 | 9/2009 | Enan | |
| 2011/0003317 A1 | 1/2011 | Enan | |
| 2011/0008471 A1 | 1/2011 | Enan | |
| 2011/0171135 A1 | 7/2011 | Enan | |
| 2012/0251641 A1 | 10/2012 | Enan et al. | |
| 2012/0328760 A1 | 12/2012 | Harada et al. | |
| 2014/0377385 A1 | 12/2014 | Enan | |
| 2015/0087516 A1 | 3/2015 | Enan | |
| 2015/0150838 A1 | 6/2015 | Enan et al. | |
| 2015/0201615 A1 | 7/2015 | Schmidt et al. | |
| 2016/0029625 A1 | 2/2016 | Kennedy et al. | |
| 2016/0165899 A1 | 6/2016 | Bissinger et al. | |
| 2017/0094963 A1 | 4/2017 | Enan | |
| 2017/0318806 A1 | 11/2017 | Kennedy et al. | |
| 2019/0015376 A1 | 1/2019 | Enan et al. | |
| 2019/0029253 A1 | 1/2019 | Enan | |
| 2019/0274312 A1 | 9/2019 | Bissinger et al. | |
| 2019/0320653 A1 | 10/2019 | Enan | |

FOREIGN PATENT DOCUMENTS

| | | | | |
|---|---|---|---|---|
| CA | 2144861 A1 * | 2/1995 | ............ | A01N 37/02 |
| WO | WO 2010/121142 A2 | 10/2010 | | |

OTHER PUBLICATIONS

U.S. Appl. No. 15/878,940, filed Jan. 24, 2018.

* cited by examiner

*Primary Examiner* — John Pak
*Assistant Examiner* — Daniel L Branson
(74) *Attorney, Agent, or Firm* — K&L Gates LLP

(57) ABSTRACT

The present invention relates to formulations and methods of arthropod control employing formulations comprising certain essential oils formulated as soaps using a saponified or partially saponified formulation comprising a mixture of fatty acids, geraniol, and peppermint oil.

47 Claims, 6 Drawing Sheets

ARTHROPOD CONTROL FORMULATIONS AND METHODS

CROSS-REFERENCE TO RELATED APPLICATIONS

This patent application claims priority under 35 U.S.C. 119(e) to U.S. Provisional Patent Application No. 62/370,749, filed on Aug. 4, 2016, the entire disclosure of which is hereby incorporated herein by reference.

FIELD OF THE INVENTION

The present disclosure relates to formulations for controlling arthropods, wherein the formulations are produced by fully or partially saponifying a mixture comprising fatty acid, geraniol, and peppermint oil. The present disclosure also relates to methods for making formulations for controlling arthropods, and to methods for controlling arthropods using the formulations described herein.

BACKGROUND

While the first recorded use of chemicals to control arthropods dates back to 2500 BC, it is only in the last 60 years that chemical control has been widely used. Early pesticides included hellebore to control body lice, nicotine to control aphids, and pyrethrin to control a wide variety of insects. Lead arsenate was first used in 1892 as an orchard spray, while at the same time it was discovered that a mixture of lime and copper sulphate (Bordeaux mixture) controlled downy mildew, a fungal disease of grapes. Many of the more recent pesticides have been developed to target specific biochemical reactions within the target organism, e.g., an enzyme necessary for photosynthesis within a plant, or a hormone required for normal development in an insect.

Recently, there has been increased research into the deleterious effects of chemical pesticides, with concomitant efforts to develop safer alternatives to current commercial pesticides. Part of this research has focused on the use of natural products, such as combinations of essential oils and/or other chemicals obtained from plants, to control pests.

Certain efforts to improve the activity of pesticides have been directed toward discovering new compounds that can function as active ingredients in the pesticides. Heretofore, attention has not generally been focused on optimizing pesticide formulations so as to significantly increase the activity of the active ingredients in the formulations.

BRIEF DESCRIPTION OF THE FIGURES

Exemplary embodiments are illustrated in the referenced figures. It is intended that the embodiments and figures disclosed herein are to be considered illustrative rather than restrictive.

Figure 1:
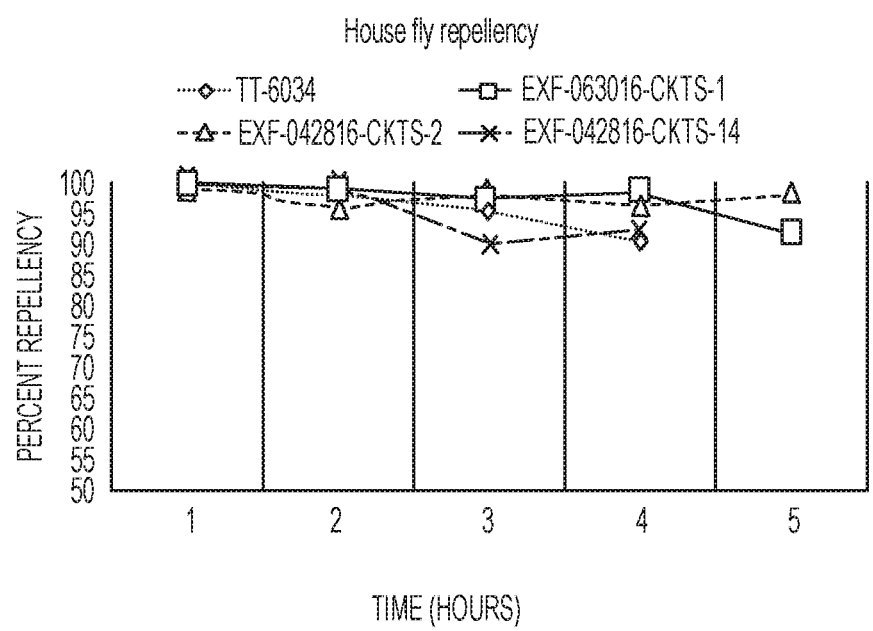
FIG. 1 depicts a graph including data from a trial to assess arthropod repellency over time for a test formulation, and wherein the graph plots percent repellency versus time (hours).

The reader will appreciate the foregoing details, as well as others, upon considering the following detailed description of various non-limiting and non-exhaustive embodiments according to the present disclosure.

SUMMARY

One aspect of the present disclosure is directed to a formulation for controlling arthropods, wherein the formulation is provided by fully or partially saponifying a mixture comprising fatty acid, geraniol, and peppermint oil. In certain non-limiting embodiments, the formulation is provided by fully or partially saponifying a mixture comprising fatty acid, 1.5% to 7.0% geraniol, and greater than 0 up to 4.0% peppermint oil, wherein the percentages are weight percentages based on total mixture weight. In other non-limiting embodiments, the formulation is provided by fully or partially saponifying a mixture comprising 6% to 10% fatty acid, 1.5% to 5% geraniol, and 0.5% to 3% peppermint oil, wherein the percentages are weight percentages based on total mixture weight.

Yet another aspect of the present disclosure is directed to a method for making a formulation for controlling arthropods. The method comprises providing a mixture comprising fatty acid, geraniol, and peppermint oil, and at least partially saponifying the mixture. According to one non-limiting embodiment of the method, the mixture comprises fatty acid, 1.5% to 7.0% geraniol, and greater than 0 up to 4.0% peppermint oil, wherein the percentages are weight percentages based on total mixture weight. In other non-limiting embodiments, the mixture comprises 6% to 10% fatty acid, 1.5% to 5% geraniol, and 0.5% to 3% peppermint oil, wherein the percentages are weight percentages based on total mixture weight.

A further aspect of the present disclosure is directed to methods of controlling arthropods. According to one non-limiting embodiment, a method for controlling arthropods comprises applying an effective amount of any of the formulations for controlling arthropods encompassed by the present disclosure to a desired host, area, surface, or object. In certain non-limiting embodiments, the formulation exhibits at least 90 percent repellency against the target arthropod for 1.5 hours, 3 hours, 4 hours, or more.

It is understood that the inventions disclosed and described in this specification are not limited to the embodiments summarized in this summary.

DESCRIPTION OF THE INVENTION

The present disclosure is directed to formulations for controlling arthropods. The formulations for controlling arthropods described herein are fully or partially saponified compositions (i.e., "soap" formulations) that are made by methods including fully or partially saponifying a mixture that includes at least fatty acid, geraniol, and peppermint oil. As will be described below, particularly surprising results have been obtained by using formulations described herein provided by methods that include partially saponifying a mixture comprising fatty acid, geraniol, and peppermint oil. The formulations herein may be applied to a desired host, surface, area, or object and have been shown to exhibit repellency for a significant period of time against arthropods evaluated in the testing described herein.

Certain terms appearing in this disclosure have the following meanings.

In this disclosure, the grammatical articles "one", "a", "an", and "the" are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The term "about" or "approximately", as used herein, means within an acceptable error range for the particular value as determined by one of ordinary skill in the art, which will depend in part on how the value is measured or determined, i.e., the limitations of the measurement system and/or the degree of precision required for a particular purpose, such as a pharmaceutical formulation. For example, "about" can mean within 1 or more than 1 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed.

The term "substantially," as used herein, means at least about 80%, preferably at least about 90%, more preferably at least about 99%, for example at least about 99.9%. In some embodiments, the term "substantially" can mean completely, or about 100%.

The term "disablement" is an effect wherein arthropods subjected to a formulation as described herein become mobility-impaired such that their mobility is reduced as compared to like arthropods that have not been exposed to the formulation. In some embodiments herein, disablement refers to an effect wherein at least 75% of the arthropods are mobility-impaired such that their mobility is reduced as compared to like arthropods that have not been exposed to the formulation. In other embodiments herein, disablement refers to an effect wherein at least 90% of the arthropods subjected to a test formulation become mobility-impaired such that their mobility is reduced as compared to like arthropods that have not been exposed to the formulation. In certain embodiments, disablement can be caused by a disabling effect at the cellular or whole-organism level brought about by exposure to a formulation.

The terms "saponification value", "saponification percentage", "percent saponified", "fully saponified", and "partially saponified", as used herein, have the following meanings. Saponification commonly refers to a reaction in which an ester is heated with an alkali, such as sodium hydroxide, producing a free alcohol and an acid salt. A common saponification reaction is the alkaline hydrolysis of a fat or an oil to produce soap. Free fatty acids also may be "saponified" by reaction with alkali, forming salts of fatty acid. A formulation that has been made by a process involving saponification can be characterized by certain saponification values. One can readily calculate the volume of potassium hydroxide (KOH) or other strong alkali that must be added to a particular mixture including free fatty acid and/or triglyceride to saponify all free fatty acid and triglyceride in the starting mixture. As used herein, a "fully saponified formulation" refers to a formulation produced by adding sufficient alkali to a mixture including free fatty acid and/or triglyceride to saponify all free fatty acid and triglyceride present in the mixture. Therefore, in a fully saponified formulation, all free fatty acid and triglyceride originally present in the mixture has been saponified by reaction with alkali. As used herein, a "partially saponified formulation" refers to a formulation produced by adding to a mixture including free fatty acid and/or triglyceride less than the amount of alkali necessary to saponify all free fatty acid and triglyceride present in the mixture. Therefore, in a partially saponified formulation, free fatty acid and/or triglyceride will be present because less than all free fatty acid and triglyceride present in the mixture has been saponified through reaction with alkali.

One can characterize the degree to which a formulation originally including free fatty acid and/or triglyceride has been saponified by addition of alkali (base). A formulation may be characterized by a saponification percentage calculated as follows:

$$\left[ \frac{\text{Actual mass of base added to a starting composition}}{\begin{array}{c}\text{Calculated mass of the base necessary to saponify}\\ \text{all free fatty acid and triglyceride in the starting compoition}\end{array}} \right] \times 100\%$$

For example, as used herein, a formulation that is "80% saponified" is a formulation produced by adding to a starting mixture (composition) only 80% of the mass of alkali (base) necessary to saponify all free fatty acid and triglyceride in the starting mixture. A fully saponified formulation will have a saponification percentage, by weight, of 100%. In a formulation that is less than 100% saponified, free fatty acid (i.e., unsaponified fatty acid) and/or triglyceride will be present.

"Repellent effect", as used herein, refers to an effect wherein a greater fraction of arthropods are repelled away from a host or area that has been treated with a formulation than a like host or area that has not been treated with the formulation. The repellent effect of a formulation can be characterized by a "percent repellency" or "mean percent repellency", which is calculated using a test procedure in which a known, identical number of arthropods are introduced onto both treated and untreated surfaces. The percent repellency of a test formulation is calculated from the test results using the following formula, wherein the "control count" is the number of arthropods repelled away from the test surface treated with the test formulation, and the "treatment count" is the number of arthropods repelled away from the test surface that has not been treated with the test formulation:

$$\left[\frac{\text{control count} - \text{treatment count}}{\text{control count}}\right] \times 100\%$$

The term "arthropod", as used herein, refers to insects, mites, flies, mosquitos, spiders, ticks, arachnoids, arachnids, larvae, parasites, and like invertebrates.

The term "pesticidal effect", as used herein, refers to an effect wherein treatment with a formulation causes at least a defined minimum percentage of the exposed target pests to die. In various non-limiting embodiments, the pesticidal effect is an effect wherein treatment with a formulation causes at one of at least 1%, at least 5%, at least 10%, at least 25%, at least 50%, at least 75%, or at least 90% of the exposed target pests to die. In this regard, if a pesticidal effect is defined to require that at least 1% of the target pests die when exposed to a formulation, then an LC1 to LC100 (lethal concentration) or an LD1 to LD100 (lethal dose) of the formulation will cause the pesticidal effect.

The term "arthropod control", as used herein, refers to the property of having a repellent effect, a pesticidal effect, or both.

The present disclosure relates, in part, to certain fully or partially saponified mixtures comprising essential oils and fatty acid. In particular, the partial saponification of the mixtures has been found to significantly enhance the arthropod repellency of the essential oil ingredients. Surprisingly, by preparing the pesticide as a formulation produced by partial saponification of mixtures comprising fatty acid, geraniol, and peppermint oil, the observed arthropod repellency of the formulation may be improved as compared with formulations made by fully saponifying the mixtures. In addition to increasing the overall potential potency of the formulations, the enhanced repellency observed from partial saponification may allow a reduction in the concentration of active ingredient(s) required for effective arthropod control.

Non-limiting embodiments of the formulations herein for controlling arthropods may be provided by fully or partially saponifying mixtures including fatty acid and one or more plant essential oils. The mixtures also can include a fixed oil, which is typically a non-volatile, non-scented plant oil. Fixed oils may stabilize the formulation, limiting the evaporation of the active components. Fixed oils useful in the formulations of the present invention include, but are not limited to, castor oil, corn oil, cottonseed oil, cumin oil, linseed oil, mineral oil, white mineral oil, olive oil, peanut oil, safflower oil, sesame oil, and soybean oil. Additionally, in various non-limiting embodiments, the formulation can be made from mixtures including generally regarded as safe (GRAS) compounds.

In various non-limiting embodiments, methods for controlling arthropods are provided in which the fully or partially saponified formulations described herein are sprayed or otherwise applied onto a surface such as, for example, the skin of an animal or person, an area, or a surface region of an object, to provide for enhanced repellency of arthropods such as, for example, flies, mosquitoes, and ticks. In a particular embodiment, duration and efficacy of repellency is extended when a partially saponified formulation is employed, as compared with a formulation produced by fully saponifying the same mixture of ingredients.

In particular non-limiting embodiments according to the present disclosure, partially saponified formulations herein provide at least 90 percent repellency of arthropods selected from flies, mosquitoes, and ticks for up to 4 hours, or more, after the formulations are applied to a surface. Certain non-limiting embodiments of the partially saponified formulations according to the present disclosure provide at least 90% repellency of a target arthropod for up to 1 hour, up to 1.5 hours, up to 2 hours, up to 3 hours, up to 4 hours, up to 5 hours, or up to 6 hours.

The inventors surprisingly observed that by partially saponifying a mixture to provide certain formulations according to the present disclosure, the formulations exhibited an increased level and/or duration of repellency as compared with a formulation made by fully saponifying the same mixture. For example, the inventors compared the degree and duration of repellency of certain partially saponified formulations of the present disclosure made by partially saponifying a mixture including fatty acid, geraniol, and peppermint to the degree and duration of repellency of a fully saponified formulation including geraniol and peppermint oil, along with the additional active ingredients vanillin, lanolin, white mineral oil, and ValPro 76. It is believed that certain partially saponified formulations according to the present disclosure could achieve a similar degree and/or duration of repellency relative to fully saponified formulations while including few active ingredients and/or a lower concentration of active ingredients.

In various non-limiting embodiments, methods of controlling arthropods such as biting or nuisance insects with high levels of repellency are provided in which a partially saponified formulation according to the present disclosure is sprayed in an area, such as an outdoor area, to repel arthropods such as, for example, flies, mosquitos, and/or ticks. In various other non-limiting embodiments, methods of arthropod control with high levels of repellency are provided in which a partially saponified formulation according to the present disclosure is applied to a surface, such as the skin of a human or a horse or other animal, to repel arthropods such as, for example, flies, mosquitos, and/or ticks.

Accordingly, the formulations of the present invention can be used to control target arthropods by either treating a host directly, or by treating an area in which the host will be located, for example, an indoor living space, outdoor patio, garden, stable, barn, pasture, or the like. For purposes of this application, a host may be, for example, a human, a horse, a cow, a goat, a pig, a bird, a livestock animal, a mammal, an animal, or a plant.

Certain of the arthropod control formulations herein are provided by fully or partially saponifying a mixture comprising fatty acid, geraniol, and peppermint oil. In certain non-limiting embodiments, the mixture comprises fatty acid and, in weight percentages based on total mixture weight, 1.5% to 7.0% geraniol, and greater than 0 up to 4.0% peppermint oil. In certain other non-limiting embodiments, the mixture comprises, in weight percentages based on total mixture weight, 6% to 10% fatty acid, 1.5% to 5% geraniol, and 0.5% to 3% peppermint oil. In various non-limiting embodiments according to the present disclosure, the fatty acid in the mixture comprises or consists of capric acid and caprylic acid. In certain embodiments of the formulation herein provided by partially saponifying a mixture comprising geraniol, peppermint oil, capric acid, and caprylic acid, the ratio of capric acid to caprylic acid in the mixture may be, by weight (wt %:wt %) or by volume (vol %:vol %) 4:1, 1:4, or in a range of ratio values, for example from 4:1 to 1:4. In some embodiments the ratio of capric acid to caprylic acid in the mixture can be 55:40.

Various embodiments of formulations for controlling arthropods according to the present disclosure may include other components such as, for example, isopropyl alcohol, glycerin, and an alkali salt. In certain embodiments including an alkali salt, the alkali salt is or comprises at least one of potassium hydroxide and potassium sorbate. In various embodiments of formulations for controlling arthropods according to the present disclosure, the formulations are made by fully or partially saponifying a mixture comprising fatty acid, Geraniol 60 (which is described below), and peppermint oil.

According to certain non-limiting embodiments herein, the formulations for controlling arthropods are, by weight, 60% to 100% saponified. According to other non-limiting embodiments herein, the formulations for controlling arthropods are, by weight, 60% to 90% saponified, or are characterized by a percent saponification in any subrange therein, by weight, such as, for example, 60% to 70%. In various non-limiting embodiments, the formulations are characterized, by weight, by 68%, 75%, 80%, or 85% saponification.

Various non-limiting embodiments of the formulations herein for controlling arthropods may include one or more of the following ingredients:

Fatty acid. Fatty acids suitable for use in the formulations herein can be obtained from natural sources such as, for example, plant or animal esters (e.g., palm oil, rape seed oil, palm kernel oil, coconut oil, babassu oil, soybean oil, castor oil, tallow, whale or fish oils, grease, lard, and mixtures thereof). Fatty acids derived from plant sources are generally preferred. Normally, purified or distilled unsaturated and/or saturated fatty acids may be employed. In certain embodiments, the fatty acids are or comprise saturated monocarboxylic acids. The fatty acids may be linear or branched, and preferably are branched. Saturated fatty acids used in the present invention can be in the form of the free fatty acid and/or salts thereof. Suitable fatty acid salts include, for example, alkali metal salts, such as sodium and/or potassium; ammonium salts; and/or alkylamine salts, such as, for example, isopropylamine, aminomethylpropanol, monoethanolamine, diethanolamine, and/or triethanolamine. Alkali metal salts, and particularly potassium salts, are preferred.

The fatty acid salts in formulations according to the present disclosure preferably are formed in situ by the addition of suitable salt forming material, e.g., base, to a mixture including the fatty acid. The base may be, for example, sodium hydroxide and/or potassium hydroxide, or any other suitable base. The base preferably is added to the fatty acid-containing mixture as a relatively dilute aqueous solution, e.g., at a concentration of 1 to 30%, preferably 5 to 20%, and more preferably about 10 to 15% w/w. The addition of base can be used to control the pH of the resulting formulation, which is preferably in the range of 6.0 to 9.0, more preferably 6.0 to 8.0, particularly 6.5 to 7.5, and especially 6.8 to 7.0 w/w. A significant improvement in the arthropod control properties of formulations according to the present disclosure has been observed at these pH values.

Formulations according to the present disclosure may be produced by saponifying mixtures including free fatty acid and, optionally, triglyceride. Examples of saturated fatty acids that may be used in producing formulations according to the present disclosure include, for example, octanoic (caprylic) acid and decanoic (capric) acid. Formulations according to the present disclosure also may be formed by partially or fully saponifying mixtures comprising triglycerides including caprylic and capric fatty acid chain, and certain embodiments of the mixtures can include capric and caprylic acid along with triglyceride based on those fatty acids. In certain non-limiting embodiments of formulations according to the present disclosure produced from mixtures including triglyceride based on capric and caprylic acids, the ratio of capric to caprylic acid in the triglyceride may be, by weight (wt %:wt %) or by volume (vol:vol %), for example, 4:1 up to 1:4 and more preferably is 2:1 to 1:2.

In various non-limiting embodiments for controlling arthropods according to the present disclosure, the ratio of the free and salt forms of capric acid to the free and salt forms of caprylic acid, by weight (wt %:wt %) or by volume (vol:vol %), is in the range of ratio values from 3:10 to 10:3, or any sub-range subsumed therein, such as, for example, 3:4 to 4:3, 3:7 to 7:3, or 4:8 to 8:4, or 6:8 to 8:6.

Geraniol. Geraniol, also called rhodinol and 3,7-dimethyl-2,6-octadien-1-ol, is a monoterpenoid and an alcohol. It is the primary part of oil-of-rose and palmarosa oil. It is used in perfumes and as a flavoring. It is also produced by the scent glands of honey bees to help them mark nectar-bearing flowers and locate the entrances to their hives. Geraniol can be obtained in a highly pure form as Geraniol Fine, FCC (Food Chemicals Codex grade), which is 98% minimum pure geraniol and 99% minimum nerol and geraniol, w/w. Geraniol can be obtained, for example, as Geraniol 60, Geraniol 85, Geraniol 95, or Geraniol 98. When Geraniol is obtained as Geraniol 60, Geraniol 85, Geraniol 95, or Geraniol 98 then about forty percent, fifteen percent, five percent, or two percent, respectively, of the oil can be nerol, w/w. Nerol is a monoterpene ($C_{10}H_{18}O$), the cis-isomer of geraniol, which can be extracted from attar of roses, oil of orange blossoms, and oil of lavender. Where an embodiment herein describes the use of any form of geraniol, other embodiments are specifically contemplated in which the geraniol is replaced by another form of geraniol (such as Geraniol Fine FCC or any geraniol/nerol mixture), nerol, geranial, neral, citral, or a mixture of any of these with each other or with any form of geraniol. Similarly, where an embodiment describes the use of any form of citral, other embodiments are specifically contemplated in which the citral is replaced by a form of geraniol (such as Geraniol Fine FCC or any geraniol/nerol mixture), nerol, geranial, neral, or a mixture of any of these with each other or with citral. Geraniol appears on the Environmental Protection Agency's FIFRA 25(b) list of compounds that are exempt from federal regulation because they are considered demonstrably safe.

In various non-limiting embodiments the formulation for controlling arthropods according to the present disclosure can be made by partially or fully saponifying a mixture that includes, by weight, between 1.5% and 7.0% geraniol, such as, for example, Geraniol 60, or may include geraniol in any sub-range subsumed therein, such as, for example, between 2.0% and 3.0%, between 3.0% and 4.0%, or between 4.0 and 6.0%, by weight. For example, in various non-limiting embodiments, the formulations herein can be derived by fully or partially saponifying mixtures including Geraniol 60 in any of the following weight concentrations: 1.5%, 2.0%, 2.5%, 3.0%, 3.5%, 4.0%, 4.5%, 5.0%, 5.5%, 6.0%, and 7.0%.

Peppermint oil. Peppermint oil is derived from the leaves of the peppermint plant or *Mentha pipertita*, a hybrid of the water mint and spearmint plants, and *M. arvensis* var. *piperascensa*, a plant from the Labiatae family. In various non-limiting embodiments the formulations herein may be formed by partially or fully saponifying mixtures including, by weight, 0.5 to 2.0% peppermint oil, or any sub-range subsumed therein, such as, for example, 0.5 to 2.0%, 1.0% to 1.5%, or 1.5% to 2.0%, by weight. In various non-limiting embodiments, the formulations herein can be derived by fully or partially saponifying mixtures including peppermint oil in any of the following weight concentrations: 0.5%, 1.0%, 1.5%, 2.0%, 2.5%, 3.0%, 3.0%, 3.5%, and 4.0%.

Solvents. Solvents suitable for use herein include isopropyl alcohol, methanol, ethanol, n-propanol, butanol, n-butanol, sec-butanol, iso-butanol, tert-butanol, acetone, butyl acetate, ethyl acetate, methylene chloride, mixtures thereof, and the like. For example, the formulations herein can be derived by fully or partially saponifying mixtures including alcohol solvent concentrations, by weight, of 1.0% to 11.0%, or in any sub-range subsumed therein, such as, for example, 3.0% to 4.0%, 5.0% to 6.0%, 7.0% to 8.0%, 9.0% to 10.0%, or 10.0% to 11.0%, by weight. In certain embodiments, the mixture comprises 10.0% isopropyl alcohol, by weight.

Glycerin. Glycerin solvents, suitable for use herein, are selected from the group consisting of glycerin, diethylene glycol, propylene glycol, triethyl citrate, isopropyl myristate, and mixtures thereof, and the like. In various non-limiting embodiments the formulation for controlling arthropods can be derived by fully or partially saponifying mixtures including glycerin concentrations, by weight, of 1.0% to 11.0%, or any sub-range subsumed therein, such as, for example, 3.0% to 4.0%, 5.0% to 6.0%, 7.0% to 8.0%, 9.0% to 10.0%, or 10.0% to 11.0%, by weight. In certain embodiments, the mixture can comprise 2.0% potassium sorbate, by weight.

Alkali salts. Alkali salts are used, for example, to hydrolyze esters and form fatty acid salts in the saponification process. In various embodiments, an aqueous solution of an alkali salt is added to the mixture of ingredients including fatty acid, geraniol, and peppermint oil to provide formulations according to the present disclosure. Examples of alkali salts suitable for use herein include, for example, potassium hydroxide and sodium hydroxide. In certain embodiments, the formulations herein are derived from mixtures including potassium hydroxide, such as in the form of a 45% w/w solution, added in a concentration of 2.0% to 5.5%, based on total mixture weight, or in any sub-range subsumed therein, such as, for example, 2.0% to 3.0%, 3.0% to 4.0%, or 4.0% to 5.0%. In another non-limiting embodiment, the formulations herein are derived by including 7% to 25.5% by weight of a 13.5% potassium hydroxide solution in the mixtures. In yet another non-limiting embodiment, 4.2% by weight of 45% potassium hydroxide solution is used.

Preservatives. Preservatives can be antioxidants, antimicrobials (molds, yeasts, or bacteria). Preservatives can comprise potassium sorbate, ammonium benzoate, alpha-tocopherol, vanillin, butylated hydroxytoluene, and methyl paraben, and combinations of any thereof. For example, potassium sorbate is a mold inhibitor and can be used to preserve the formulation. In various non-limiting embodiments, the formulation can comprise potassium sorbate as a preservative. Potassium sorbate and/or other preservatives can be used in concentrations, by weight, in a range of 0.1% to 0.5%, or in any sub-range subsumed therein, such as, for example, 0.1% to 0.2%, 0.3% to 0.4%, or 0.3% to 0.5%. In certain embodiments, the formulation can comprise 2.0% of potassium sorbate, by weight.

Water. Water may be used as a solvent, carrier, and/or diluent in the formulations according to the present disclosure. In various non-limiting embodiments, the formulation comprises water in concentrations, by weight, of 35% to 85%, or in any sub-range subsumed therein, such as, for example, 40% to 60%, 50 to 70%, or 60% to 80%. In certain embodiments, the formulation comprises 71.6% water, by weight.

In various non-limiting embodiments, the formulations for controlling arthropods herein are derived by partially or fully saponifying a mixture comprising, in weight percentages based on total mixture weight, 1.5% to 7.0% Geraniol 60, greater than 0 to 4.0% peppermint oil, and at least one fatty acid. In another non-limiting embodiment, the partially or fully saponified formulation can derived from mixtures comprising, in weight percentages based on total mixture weight, 1.5% to 6.0% Geraniol 60, 0.5% to 3% peppermint oil, and at least one fatty acid. In various non-limiting embodiments, the formulation can be less than fully saponified (100% saponified). For example, in various embodiments, the partially saponified formulation is at least 60% and up to substantially 100% saponified. In various non-limiting embodiments, the partially saponified formulations can be derived from mixtures including the fatty acids capric acid and caprylic acid as discussed herein and in similar amounts and concentrations. For example, the concentration of free saturated fatty acids and/or triglycerides thereof present in the mixtures that are partially or fully saponified may be, by weight, from 4.0% to 8.0%, or in any sub-range subsumed therein, such as, for example, 4.0% to 5.0%, 5.0% to 6.0%, 5.0% to 6.0%, or 7.0% to 8.0%.

In various non-limiting embodiments of a formulation for controlling arthropods is provided by fully or partially saponifying a composition comprising fatty acid, and wherein the formulation further comprises geraniol and peppermint oil. In certain embodiments, the formulation may also include isopropyl alcohol, glycerin, and an alkali salt. In various embodiments the alkali salt can comprise potassium hydroxide. In certain embodiments, the fatty acid can comprise a mixture of capric acid and caprylic acid.

Various non-limiting embodiments of a formulation for controlling arthropods according to the present disclosure are produced by fully or partially saponifying a mixture comprising fatty acid, geraniol, and peppermint oil, wherein the formulation includes isopropyl alcohol, glycerin, water, potassium hydroxide, and potassium sorbate in concentrations as discussed herein.

In various non-limiting embodiments, a method for controlling arthropods using the fully or partially saponified formulations herein can comprise applying an effective amount of the formulation to a desired host, area, or object; and controlling arthropods, wherein the applied formulation exhibits at least 90 percent repellency against the target arthropod for at least 1.5 hours, at least 3 hours, at least 4 hours, or longer.

In various non-limiting embodiments, the present invention provides a method of controlling arthropods by administering the formulations described herein. The formulations used in the methods of the present invention can be used to control arthropods by either treating a host directly, or by treating an area in which the host will be located. For example, the host can be treated directly by using a cream or spray formulation, which can be applied externally or topically, e.g., to the skin of a human. A formulation can be applied to the host, for example, in the case of a human, using formulations of a variety of personal products or cosmetics for use on the skin or hair. For example, any of the following can be used: fragrances, colorants, pigments, dyes, colognes, skin creams, skin lotions, deodorants, talcs, bath oils, soaps, shampoos, hair conditioners, styling agents, and the like.

The formulations of the present invention can be employed alone or in the form of mixtures with such solid and/or liquid dispersible carrier vehicles and/or other known compatible active agents such as other repellents, pesticides, or acaricides, nematicides, fungicides, bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

The formulations of the present invention can be formulated or mixed with, if desired, conventional inert pesticide diluents or extenders of the type usable in conventional arthropod control agents, e.g., conventional dispersible carrier vehicles such as gases, solutions, emulsions, suspensions, emulsifiable concentrates, spray powders, pastes, soluble powders, wettable powders, dusting agents, granules, foams, mousses, pastes, tablets, aerosols, amorphous silica, natural and synthetic materials impregnated with active compounds, microcapsules, coating formulations for use on seeds, and formulations used with burning equipment, such as fumigating cartridges, fumigating cans and fumigating coils, as well as Ultra Low Volume cold mist and warm mist formulations, etc.

The formulations of the present invention can further comprise surface-active agents. Examples of surface-active agents that can be employed with the present invention, include emulsifying agents, such as non-ionic and/or anionic emulsifying agents (e.g., polyethylene oxide esters of fatty acids, polyethylene oxide ethers of fatty alcohols, cyclodextrins, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents such as lignin, sulfite waste liquors, methyl cellulose, etc.

In various non-limiting embodiments the formulations of the present invention can be a water-based partially saponified formulation. The surfactant of the water-based partially saponified formulation is provided to facilitate mixture of the arthropod control formulation with the water. The surfactant may include an end having a carboxyl group, which will face water molecules, and a hydrocarbon end, which will face an oil component active ingredient (e.g., geraniol, peppermint oil). As such, the surfactant allows the water and the oil component of the formulation to be mixed to form an emulsion. Various surfactants may be used in the formulations of the present invention, for example, sodium lauryl sulfate (SLS, anionic), chlorhexidine (CLH, cationic), and Poloxamer 407 (POL407, nonionic), sodium dodecylsulfate (SDS), sodium cholate, sodium deoxycholate, n-lauroylsarcosine, lauryldimethylamine-oxide (LDAO), cetyltrimethylammoniumbromide (CTAB), bis(2-ethylhexyl)sulfosuccinate, potassium or other salts of fatty acids, or mixtures thereof.

The solvent of the water-based formulations herein serves to reduce the water-oil surface tension of the formulations. By reducing this surface tension, the oil droplets are more readily dispersed in the water, and a thin film of the oil-water mixture is allowed to form on the treated surfaces, which surfaces may include a host, areas within a household, outdoor areas, plants and the arthropods themselves. The solvent may also serve as a carrier and a synergist. The solvent may assist in fast penetration through the cell membrane of an arthropod being controlled to ensure the arrival of sufficient active ingredients to the site of action. The solvent may assist in wetting the arthropod exoskeleton to facilitate exposure of the cell membrane to the formulation and/or may dissolve portions of the exoskeleton. The solvent is suitably relatively polar, and preferably is a lower alcohol or ester having a molecular weight of less than 400, more preferably less than 200, and particularly in the range from 40 to 100. Isopropanol and/or ethanol are particularly preferred lower alcohol co-solvents. Various solvents may be used, for example, mineral oil, white mineral oil, isopar M, isopar C, alcohol, ethanol, isopropyl alcohol, glycerin, or mixtures thereof.

In certain embodiments, to produce the water-based formulations herein, the solvent and fatty acids are mixed together. The one or more plant essential oils are then added to the solvent/fatty acids to create a mixture. The preservative is then added to the mixture followed by the addition of water to create a slurry. The mixture of these ingredients is then fully or partially saponified by adding an alkali salt solution to the mixture. In various non-limiting embodiments, the final concentration of the essential oils in the formulation may be, by weight, for example, about 4%; the final concentration of the preservative in the formulation may be, by weight, for example, about 0.2%; the final concentration of the (non-water) solvent in the formulation may be, by weight, for example, about 12%; and the final concentration of the alkali salt may be, by weight, for example, about 2%.

In various non-limiting embodiments, a method for making a formulation for controlling arthropods can comprise mixing a fatty acid with an alkali salt solution to provide a fully or partially saponified mixture and adding geraniol and peppermint oil to the fully or partially saponified mixture. In certain embodiments, the method for making the formulation for controlling arthropods can further include adding a mixture of capric acid and caprylic acid and potassium hydroxide. In certain non-limiting embodiments the method for making the formulation for controlling arthropods can include adding a range of ingredients. For example, the method can include adding the geraniol in a concentration range, by weight, from 1.5% to 7.0% geraniol. In another example, the method can include adding the peppermint oil in a concentration range, by weight, up to 4.0%. In certain embodiments, the method for making the formulation for controlling arthropods can further include adding a solvent to the fatty acids or adding a solvent to the essential oils in the formulation.

In various non-limiting embodiments, the fatty acids and the essential oils are directly mixed together to provide a mixture that is not saponified.

Once a water-based fully or partially saponified formulation has been prepared, it may be applied to a desired host, area, or object to affect arthropod control. Once applied, it will form a thin film on the treated surfaces, adhering thereto and providing effective arthropod control. The formulation may be applied to the host, area, or object in a variety of manners known in the art, for example, the formulation may be prepared as an aerosol or trigger spray. Some embodiments of the formulations according to the present disclosure are characterized by rapid killing, e.g., kill-on-contact, and some embodiments are characterized by residual effects, i.e., the formulation remains on treated surface affecting arthropod control for an extended period of time.

Certain mixtures of liquefied hydrocarbons, such as propellants A-46, A-70, or 142A may be used as propellants in embodiments of spray mixtures. Where an embodiment describes the use of one propellant, other embodiments are specifically contemplated in which the designated propellant is replaced with any of the other propellant, or a mixture of any of these propellants with each other or with the designated propellant.

The formulations of the present invention can comprise an admixture with one or more suitable carrier and optionally with a suitable surface active agent and/or one or more surfactant agents, plant essential oil compounds and/or derivatives thereof, natural and/or synthetic, including racemic mixtures, enantiomers, diastereomers, hydrates, salts, solvates, and metabolites, etc.

A suitable carrier can include any carrier in the art known for plant essential oils, provided the carrier does not adversely affect the formulations of the present invention. The term "carrier" as used herein means an inert or fluid material, which can be inorganic or organic and of synthetic or natural origin, with which the active compound is mixed or formulated to facilitate its application to the host, area, or other object to be treated, or to facilitate its storage, transport and/or handling. In general, any of the materials customarily employed in formulating repellents, pesticides, herbicides, or fungicides, are suitable.

For example, embodiments of the present invention can include a carrier having a surface area, with the saponified or partially saponified formulation coated on the surface area of the carrier. The carrier may be, for example, crystals, powder, dust, granules or the like, which provides an absorption surface area for the saponified or partially saponified soaps and formulations. One example of a carrier that can be used in accordance with the present invention is diatomaceous earth (DE). DE is a naturally occurring sedimentary rock that is easily crumbled into a fine powder. This powder has an abrasive feel, similar to pumice powder, and is very light, due to its high porosity. Diatomaceous earth consists of fossilized remains of diatoms, a type of hard shelled algae.

To produce various non-limiting embodiments of the present invention, the carrier and the fully or partially saponified formulation are mixed to allow the carrier to become coated with the formulation.

In various non-limiting embodiments of the invention, after the carrier has been coated with the arthropod control formulation, the carrier/formulation can be applied to a desired host, area, or object to affect arthropod control. Because the carrier reduces the volatility of the arthropod control formulation, the formulation will remain active for an amount of time that is greater than the time the formulation alone, i.e., the formulation without the carrier, would remain active. As such, the carrier/formulation continues to provide arthropod control after the time by which the formulation, alone, would have volatilized.

Non-limiting embodiments of the present invention can be used to control arthropods by treating an area directly. For example, the area can be treated by spreading or dispersing the formulation, for example, manually, automatically, with a fertilizer spreader, or the like.

An area can be treated with a formulation of the present invention, for example, by using a spray formulation, such as an aerosol or a pump spray, or a burning formulation, such as a candle or a piece of incense containing the formulation. Of course, various treatment methods can be used without departing from the spirit and scope of the present invention. For example, formulations can be comprised in household products such as: air fresheners (including heated air fresheners in which arthropod repellent substances are released upon heating, e.g., electrically, or by burning); hard surface cleaners; or laundry products (e.g., laundry detergent-containing formulations, conditioners).

In certain non-limiting embodiments of the formulations herein, each ingredient in the mixture that is subjected to saponification can make up between about 1% to about 99%, by weight (wt/wt %) or by volume (vol/vol %), of the mixture. For example, one formulation of the present invention comprises, by weight, about 3.5% Geraniol 60 and about 8% fatty acid. As used herein, percent amounts, by weight or by volume, of compounds are to be understood as referring to relative amounts of the compounds. As such, for example, a formulation including 7% linalool, 35% thymol, 4% alpha-pinene, 30% para-cymene, and 24% soy bean oil (wt/wt %) can be said to include a ratio of 7 to 35 to 4 to 30 to 24 linalool, thymol, alpha-pinene, para-cymene, and soybean oil, respectively (by volume). As such, if one compound is removed from the formulation, or additional compounds or other ingredients are added to the formulation, it is contemplated that the remaining compounds can be provided in the same relative amounts. For example, if soybean oil were removed from the exemplary formulation, the resulting formulation would include 7 to 35 to 4 to 40 linalool, thymol, alpha-pinene, and para-cymene, respectively (by volume). This resulting formulation would include 9.21% linalool, 46.05% thymol, 5.26% alpha-pinene, and 39.48% para-cymene (vol/vol %). For another example, if safflower oil were added to the original formulation to yield a final formulation containing 40% (vol/vol) safflower oil, then the resulting formulation would include 4.2% linalool, 21% thymol, 2.4% alpha-pinene, 18% para-cymene, 14.4% soy bean oil, and 40% safflower oil (vol/vol %). One having ordinary skill in the art would understand that volume percentages are easily converted to weight percentages based on the known or measured specific gravity of the substance.

Further discussion of various approaches to screening, preparing, evaluating, and using arthropod control formulations are also disclosed in International Publication Number WO 2014/063109, which is incorporated by reference in its entirety. One skilled in the art will recognize many methods and materials similar or equivalent to those described herein, which could be used in the practice of the present invention. Indeed, the present invention is in no way limited to the methods and formulations specifically described herein.

EXAMPLES

The following examples are provided to better illustrate the formulations and methods according to the present disclosure and are not to be interpreted as limiting the scope of the present disclosure. To the extent that specific materials are mentioned, it is merely for purposes of illustration and is not intended to limit the invention.

Example 1

Repellency of Plant-Based Repellent Against Biting and Nuisance Flies

Materials and Methods

Flies. *Musca domestica* (L.) were used from an established laboratory colony. *Stomoxys calcitrans* (L.) pupae were supplied by the Veterinary Entomology Research Laboratory at New Mexico State University. The flies were maintained in an insectary at 23±2° C., approximately 55% relative humidity, and using a photoperiod of 12 hours of light: 12 hours of dark.

Test Substances

Several formulations obtained by preparing mixtures including Geraniol 60, peppermint oil, and a mixture of capric acid and caprylic acid, and partially saponifying the mixtures by additional of alkali were produced and tested with respect to efficacy, duration, compatibility aesthetics, and stability. Tables 1-15 identify the tested formulations and the ingredients assembled to provide the formulations. All percentages in Tables 1-15 are weight percentages based on the total weight of the assembled ingredients.

TABLE 1

All values are by weight %

| | TT6034 | EXF-063016-CKTS-1 | EXF-070915-CKTS-20 | EXF-070915-CKTS-35 | EXF-070915-CKTS-36 | EXF-070915-CKTS-38 | EXF-070915-CKTS-40 | EXF-070915-CKTS-11 |
|---|---|---|---|---|---|---|---|---|
| Total | 100% | 100% | 100% | 100% | 100% | 100% | 100% | 100% |
| Geraniol 60 | 3.50% | | 4% | 3.50% | 3% | 3.50% | 3.50% | 3.50% |
| Geraniol 98 | | 3.50% | | | | | | |
| Peppermint Oil | 0.50% | 0.50% | | | | | | 0.50% |
| Isopropyl Alcohol | 10% | 10% | 10% | 5% | | 10% | 10% | 10% |
| Glycerin | 2% | 2% | | 4% | 4% | 4% | 2% | 5% |
| Distilled Water | 71.60% | 71.60% | 63% | 60.50% | 61% | 58.50% | 60.50% | 53% |
| Capric and Caprylic Acid | 8% | 8% | | | | | 4% | |
| Potassium Sorbate | 0.20% | 0.20% | | | | | | |
| 45% KOH Solution | 4.20% | 4.20% | | | | | | |
| Lauric Acid | | | 8% | 8% | 8% | 8% | 4% | 8% |
| Triethyl Citrate | | | 2% | | | 2% | 2% | 2% |
| 13.5% KOH Solution | | | 13% | 14% | 14% | 14% | 14% | 18% |
| Polypropylene Carbonate | | | | 5% | 10% | | | |

TABLE 2

All values are by weight %

| | EXF-070915-CKTS-12 | EXF-070915-CKTS-13 | EXF-070915-CKTS-14 | EXF-070915-CKTS-15 | EXF-070915-CKTS-16 | EXF-070915-CKTS-17 | EXF-070915-CKTS-18 |
|---|---|---|---|---|---|---|---|
| Total | 100% | 100% | 100% | 100% | 100% | 100% | 100% |
| Geraniol 60 | 3.50% | 3.50% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 10% | 10% | 10% | 10% | 10% | 10% | 10% |
| Distilled Water | 55.90% | 62% | 60% | 62.95% | 62.98% | 63% | 65% |
| Capric and Caprylic Acid | | | | | | 8% | |
| Lauric Acid | 8% | 8% | 8% | 8% | 8% | | 6% |
| Triethyl Citrate | 2% | 2% | 4% | 2% | 2% | 2% | 2% |
| 13.5% KOH Solution | 18% | 12% | 12% | 13% | 13% | 13% | 13% |
| White Mineral Oil | 2% | 2% | 2% | | | | |
| Hydroxyethyl-cellulose | 0.10% | | | 0.05% | 0.025% | | |

TABLE 3

All values are by weight %

| | EXF-070915-CKTS-19 | EXF-070915-CKTS-21 | EXF-070915-CKTS-22 | EXF-070915-CKTS-23 | EXF-070915-CKTS-24 | EXF-070915-CKTS-25 | EXF-070915-CKTS-26 |
|---|---|---|---|---|---|---|---|
| Total | 100% | 100% | 100% | 100% | 100% | 100% | 100% |
| Geraniol 60 | 3.50% | 3.50% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 10% | 10% | 10% | 10% | 10% | 10% | 10% |
| Glycerin | | | | | | 4% | 4% |
| Distilled Water | 67% | 60% | 56% | 56% | 56% | 60% | 60% |
| Capric and caprylic acid | | | | 4% | 8% | 8% | 4% |
| Lauric Acid | 4% | 8% | 8% | 4% | | | 4% |
| Triethyl Citrate | 2% | | | | | | |
| 13.5% KOH Solution | 13% | 18% | 18% | 18% | 18% | 14% | 14% |
| White Mineral Oil | | | 4% | 4% | 4% | | |

TABLE 4

| | EXF-070915-CKTS-27 | EXF-070915-CKTS-28 | EXF-070915-CKTS-29 | EXF-070915-CKTS-30 | EXF-070915-CKTS-31 | EXF-070915-CKTS-32 | EXF-070915-CKTS-33 |
|---|---|---|---|---|---|---|---|
| All values are by weight % | | | | | | | |
| Total | 100% | 100% | 100% | 100% | 100% | 100% | 100% |
| Geraniol 60 | 3.50% | 3.50% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 10% | 10% | 10% | 10% | 10% | 10% | |
| Glycerin | 2% | 2% | 2% | 4% | 4% | 2% | 4% |
| Distilled Water | 62% | 62% | 64% | 62% | 60% | 62% | 60% |
| Capric and caprylic acid | 8% | 4% | | | | | |
| Lauric Acid | | 4% | 6% | 6% | 8% | 8% | 8% |
| 13.5% KOH Solution | 14% | 14% | 14% | 14% | 14% | 14% | 14% |
| Polypropylene Carbonate | | | | | | | 10% |

TABLE 5

| | EXF-070915-CKTS-34 | EXF-070915-CKTS-37 | EXF-070915-CKTS-39 | EXF-070915-CKTS-41 | EXF-070915-CKTS-43 | EXF-070915-CKTS-44 | EXF-070915-CKTS-45 |
|---|---|---|---|---|---|---|---|
| All values are by weight % | | | | | | | |
| Total | 100% | 100% | 100% | 100% | 100% | 100% | 100% |
| Geraniol 60 | 3.50% | 3.50% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 5% | 10% | 10% | | 10% | 10% | 10% |
| Glycerin | 4% | 4% | 2% | 2% | 2% | 4% | 4% |
| Distilled Water | 60% | 58% | 60% | 62% | 54% | 49.80% | 49.80% |
| Capric and caprylic acid | | | 4% | 8% | 8% | | |
| Potassium Sorbate | | | | | | 0.20% | 0.20% |
| Lauric Acid | 8% | 8% | 4% | | | 8% | 8% |
| Triethyl Citrate | | 2% | 2% | | | 10% | |
| 13.5% KOH Solution | 14% | 14% | 14% | 14% | 22% | 14% | 14% |
| Polypropylene Carbonate | 5% | | | 10% | | | |
| Isopropyl Myristate | | | | | | | 10% |

TABLE 6

| | EXF-070915-CKTS-46 | EXF-070915-CKTS-47 | EXF-070915-CKTS-48 | EXF-070915-CKTS-49 | EXF-070915-CKTS-50 | EXF-122815-CKTS-1 | EXF-122815-CKTS-2 |
|---|---|---|---|---|---|---|---|
| All values are by weight % | | | | | | | |
| Total | 100% | 100% | 100% | 100% | 100% | 100% | 100% |
| Geraniol 60 | 3.50% | 5% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 10% | 10% | 10% | 10% | 10% | 5% | 10% |
| Glycerin | 10% | 4% | 2% | 2% | 2% | 2% | 2% |
| Distilled Water | 53.80% | 58.30% | 67.30% | 72.80% | 69.80% | 76.60% | 75.60% |
| Capric and caprylic acid | | | 6% | 4% | 6% | 8% | 4% |
| Potassium Sorbate | 0.20% | 0.20% | 0.20% | 0.20% | 0.20% | 0.20% | 0.20% |
| 45% KOH Solution | | | | | | 4.20% | 4.20% |
| Lauric Acid | 8% | 8% | | | | | |
| 13.5% KOH Solution | 14% | 14% | 10.50% | 7% | 8% | | |

TABLE 7

| | EXF-122815-CKTS-3 | EXF-122815-CKTS-4 | EXF-122815-CKTS-5 | EXF-122815-CKTS-8 | EXF-122815-CKTS-9 | EXF-122815-CKTS-10 | EXF-122815-CKTS-11 |
|---|---|---|---|---|---|---|---|
| All values are by weight % | | | | | | | |
| Total | 100% | 100% | 100% | 100% | 100% | 100% | 100% |
| Geraniol 60 | 3.50% | 0% | 0% | 0% | 0% | 0% | 0% |

TABLE 7-continued

| | | | All values are by weight % | | | | |
|---|---|---|---|---|---|---|---|
| | EXF-122815-CKTS-3 | EXF-122815-CKTS-4 | EXF-122815-CKTS-5 | EXF-122815-CKTS-8 | EXF-122815-CKTS-9 | EXF-122815-CKTS-10 | EXF-122815-CKTS-11 |
| Peppermint Oil | 0.50% | 0.50% | 0.50% | 0.50% | 0.50% | 0.50% | 0.50% |
| Isopropyl Alcohol | 5% | 10% | 5% | 10% | 8% | 8% | 10% |
| Glycerin | 2% | 2% | 2% | 2% | 2% | 2% | 2% |
| Distilled Water | 82.60% | 75.10% | 80.10% | 71.60% | 75.60% | 73.60% | 73.10% |
| Capric and caprylic acid | 4% | 8% | 8% | 8% | 6% | 8% | 8% |
| Potassium Sorbate | 0.20% | 0.20% | 0.20% | 0.20% | 0.20% | 0.20% | 0.20% |
| 45% KOH Solution | 2.20% | 4.20% | 4.20% | 4.20% | 4.20% | 4.20% | 4.20% |
| Lemongrass | | | | 3.50% | 3.50% | 3.50% | 2% |

TABLE 8

| | | | All values are by weight % | | | | |
|---|---|---|---|---|---|---|---|
| | EXF-122815-CKTS-12 | EXF-122815-CKTS-14 | EXF-122815-CKTS-15 | EXF-122815-CKTS-16 | EXF-122815-CKTS-17 | EXF-122815-CKTS-18 | EXF-122815-CKTS-19 |
| Total | 100% | 100% | 100% | 100% | 100% | 100% | 100% |
| Geraniol 60 | 0% | 3.50% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 10% | 8% | 6% | 0% | 0% | 0% | 0% |
| Glycerin | 2% | 2% | 2% | 2% | 2% | 2% | 2% |
| Distilled Water | 72.30% | 73.60% | 75.60% | 71.60% | 71.60% | 71.60% | 71.60% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 5% | 4.20% | 4.20% | 4.20% | 4.20% | 4.20% | 4.20% |
| Lemongrass | 2% | | | | | | |
| Triethyl Citrate | | | | 10% | | | |
| Isopropyl Myristate | | | | | 10% | | |
| Vegetable Oil | | | | | | 10% | |
| Castor Oil | | | | | | | 10% |

TABLE 9

| | | | All values are by weight % | | | | |
|---|---|---|---|---|---|---|---|
| | EXF-122815-CKTS-20 | EXF-122815-CKTS-21 | EXF-122815-CKTS-22 | EXF-122815-CKTS-23 | EXF-122815-CKTS-24 | EXF-122815-CKTS-25 | EXF-122815-CKTS-26 |
| Total | 100% | 100% | 100% | 100% | 100% | 100% | 100% |
| Geraniol 60 | 3.50% | 3.50% | 3.50% | 3.50% | 3.50% | 3.50% | 3.50% |
| Peppermint Oil | 0.50% | 0.50% | 0.50% | 0.50% | 0.50% | 0.50% | 0.50% |
| Isopropyl Alcohol | 5% | 5% | 4% | 3% | 2% | 2% | 3% |
| Glycerin | 2% | 2% | 2% | 2% | 2% | 2% | 2% |
| Distilled Water | 71.60% | 71.60% | 71.60% | 71.60% | 71.60% | 70.30% | 70.80% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 4.20% | 4.20% | 4.20% | 4.20% | 4.20% | 5.50% | 5% |
| Isopropyl Myristate | 5% | | | | | | |
| Triethyl Citrate | | 5% | 6% | 7% | 8% | 8% | 7% |

TABLE 10

| | | | All values are by weight % | | | | |
|---|---|---|---|---|---|---|---|
| | EXF-122815-CKTS-27 | EXF-122815-CKTS-28 | EXF-042816-CKTS-9 | EXF-042816-CKTS-1 | EXF-042816-CKTS-10 | EXF-042816-CKTS-3 | EXF-042816-CKTS-4 |
| Total | 100% | 100% | 100% | 100% | 100% | 100% | 100% |
| Geraniol 60 | 3.50% | 3.50% | 1.50% | 2.50% | 1.50% | 2.50% | 2% |

TABLE 10-continued

All values are by weight %

| | EXF-122815-CKTS-27 | EXF-122815-CKTS-28 | EXF-042816-CKTS-9 | EXF-042816-CKTS-1 | EXF-042816-CKTS-10 | EXF-042816-CKTS-3 | EXF-042816-CKTS-4 |
|---|---|---|---|---|---|---|---|
| Peppermint Oil | 0.50% | 0.50% | 1% | 1.50% | 1.50% | | |
| Isopropyl Alcohol | 2% | 3% | 10% | 10% | 10% | 7% | 7% |
| Glycerin | 2% | 2% | 2% | 2% | 2% | 2% | 2% |
| Distilled Water | 70.80% | 71.30% | 71.60% | 71.60% | 71.60% | 71.60% | 72.10% |
| Capric and caprylic acid | 8% | 8% | 8% | 8% | 8% | 7% | 7% |
| Potassium Sorbate | 0.20% | 0.20% | 0.20% | 0.20% | 0.20% | 0.20% | 0.20% |
| 45% KOH Solution | 5% | 4.50% | 4.20% | 4.20% | 4.20% | 4.20% | 4.20% |
| Lauric Acid | | | 1.50% | | 1% | 1% | 1% |
| Triethyl Citrate | 8% | 7% | | | | 3% | 3% |
| White Mineral Oil | | | | | | | |
| Lanolin | | | | | | | |
| ValPro 76 | | | | | | | |
| Ammonium Benzoate | | | | | | | |
| Alpha Tocopherol | | | | | | | |
| Eugenol | | | | | | 1.50% | 1.50% |

TABLE 11

All values are by weight %

| | EXF-070915-CKTS-1 | EXF-070915-CKTS-2 | EXF-070915-CKTS-3 | EXF-070915-CKTS-4 | EXF-070915-CKTS-5 | EXF-070915-CKTS-6 | EXF-070915-CKTS-7 |
|---|---|---|---|---|---|---|---|
| Total | 100% | 100% | 100% | 100% | 100% | 100% | 100% |
| Geraniol 60 | 3% | 3% | 3% | 3% | 3% | 3% | 3% |
| Peppermint Oil | 2% | 2% | 2% | 2% | 2% | 2% | 2% |
| Isopropyl Alcohol | 10% | 10% | 10% | 10% | 10% | 10% | 10% |
| Glycerin | 5% | 5% | 5% | 5% | 5% | 5% | 5% |
| Distilled Water | 52% | 44.50% | 54% | 56% | 58% | 60% | 62% |
| Lauric Acid | 8% | 8% | 8% | 8% | 8% | 8% | 8% |
| Triethyl Citrate | 2% | 2% | 2% | 2% | 2% | 2% | 2% |
| 13.5% KOH Solution | 18% | 25.50% | 16% | 14% | 12% | 10% | 8% |

TABLE 12

All values are by weight %

| | EXF-070915-CKTS-8 | EXF-070915-CKTS-9 | EXF-070915-CKTS-10 | EXF-122815-CKTS-6 | EXF-122815-CKTS-7 | EXF-122815-CKTS-13 | EXF-042816-CKTS-2 | EXF-042816-CKTS-14 |
|---|---|---|---|---|---|---|---|---|
| Total | 100% | 100% | 100% | 100% | 100% | 100% | 100% | 100% |
| Geraniol 60 | 5% | 3% | 3% | 0% | 0% | 0% | 2% | |
| Geraniol 98 | | | | | | | | 2% |
| Peppermint Oil | 2% | 2% | 2% | 2% | 2% | 2% | 2% | 2% |
| Isopropyl Alcohol | 10% | 10% | 10% | 5% | 5% | 10% | 10% | 10% |
| Glycerin | 5% | 5% | 5% | 2% | 2% | 2% | 2% | 2% |
| Distilled Water | 50% | 49.50% | 51.80% | 78.60% | 79.60% | 70.80% | 71.60% | 71.60% |
| Capric and caprylic acid | | | | 8% | 8% | 8% | 8% | 8% |
| Potassium Sorbate | | | | 0.20% | 0.20% | 0.20% | 0.20% | 0.20% |
| 45% KOH Solution | | | | 4.20% | 3.20% | 5% | 4.20% | 4.20% |
| Lauric Acid | 8% | 8% | 8% | | | | | |
| Triethyl Citrate | 2% | 2% | 2% | | | | | |
| 13.5% KOH Solution | 18% | 18% | 18% | | | | | |
| White Mineral Oil | | 2.50% | | | | | | |
| Lemongrass | | | | | | 2% | | |
| Hydroxyethyl-cellulose | | | 0.20% | | | | | |

TABLE 13

All values are by weight %

| | EXF-042816-CKTS-5 | EXF-042816-CKTS-7 | EXF-042816-CKTS-8 | EXF-042816-CKTS-6 | EXF-122815-CKTS-41 | EXF-122815-CKTS-29 | EXF-122815-CKTS-30 |
|---|---|---|---|---|---|---|---|
| Total | 100% | 100% | 100% | 100% | 100% | 100% | 100% |
| Geraniol 60 | | | | | 6% | 7% | 7% |
| Peppermint Oil | 3% | 3% | 3% | 4% | | | |
| Isopropyl Alcohol | 10% | 10% | 10% | 10% | 10% | 10% | 10% |
| Glycerin | 2% | 2% | 2% | 2% | 2% | 2% | 2% |
| Distilled Water | 72.60% | 71.60% | 71.60% | 71.60% | 69.60% | 68.60% | 67.80% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 4.20% | 4.20% | 4.20% | 4.20% | 4.20% | 4.20% | 5% |
| Lauric Acid | | | | 1% | | | |
| Eugenol | | 1% | | | | | |

TABLE 14

All values are by weight %

| | EXF-122815-CKTS-31 | EXF-122815-CKTS-32 | EXF-122815-CKTS-33 | EXF-122815-CKTS-34 | EXF-122815-CKTS-35 | EXF-122815-CKTS-37 | EXF-122815-CKTS-39 |
|---|---|---|---|---|---|---|---|
| Total | 100% | 100% | 100% | 100% | 100% | 100% | 100% |
| Geraniol 60 | 7% | 7% | 7% | 7% | 7% | 7% | 7% |
| Peppermint Oil | | | | | | | |
| Isopropyl Alcohol | 10% | 10% | 10% | 10% | 10% | 4% | 5% |
| Glycerin | 2% | 2% | 2% | 2% | 2% | 2% | 2% |
| Distilled Water | 67.30% | 66.80% | 68.80% | 69% | 69.30% | 68.60% | 68.60% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 5.50% | 6% | 4% | 3.80% | 3.50% | 4.20% | 4.20% |
| Triethyl Citrate | | | | | | 6% | 5% |

TABLE 15

All values are by weight %

| | EXF-122815-CKTS-43 | EXF-122815-CKTS-47 | EXF-070915-CKTS-42 | EXF-122815-CKTS-52 | EXF-122815-CKTS-60 | EXF-122815-CKTS-61 | EXF-122815-CKTS-70 |
|---|---|---|---|---|---|---|---|
| Total | 100% | 100% | 100% | 100% | 100% | 100% | 100% |
| Geraniol 60 | 7% | 7% | 3.50% | 4% | 4% | 4% | 3% |
| Peppermint Oil | | | | | | | |
| Isopropyl Alcohol | 6% | 7% | 10% | 5% | 6% | 6% | 7% |
| Glycerin | 2% | 2% | 2% | 2% | 2% | 2% | 2% |
| Distilled Water | 68.60% | 68.60% | 62.50% | 71.60% | 71.10% | 70.60% | 68.60% |
| Capric and caprylic acid | 8% | 8% | 8% | 8% | 8% | 8% | 8% |
| Potassium Sorbate | 0.20% | 0.20% | | 0.20% | 0.20% | 0.20% | 0.20% |
| 45% KOH Solution | 4.20% | 4.20% | | 4.20% | 4.20% | 4.20% | 4.20% |
| 13.5% KOH Solution | | | 14% | | | | |
| Triethyl Citrate | 4% | 3% | | 5% | 4% | | 3% |
| Vanillin | | | | | 0.50% | 1% | 1% |
| Eugenol | | | | | | | 1.50% |

TABLE 16

All values are by weight %

| | EXF-122815-CKTS-36 | EXF-122815-CKTS-38 | EXF-122815-CKTS-42 | EXF-122815-CKTS-45 | EXF-122815-CKTS-46 | EXF-122815-CKTS-48 | EXF-122815-CKTS-49 |
|---|---|---|---|---|---|---|---|
| Total | 100% | 100% | 100% | 100% | 100% | 100% | 100% |
| Geraniol 60 | 7% | 7% | | 5% | | 4% | |
| Geraniol 98 | | | 6% | | 5% | | 4% |

TABLE 16-continued

All values are by weight %

|  | EXF-122815-CKTS-36 | EXF-122815-CKTS-38 | EXF-122815-CKTS-42 | EXF-122815-CKTS-45 | EXF-122815-CKTS-46 | EXF-122815-CKTS-48 | EXF-122815-CKTS-49 |
|---|---|---|---|---|---|---|---|
| Isopropyl Alcohol | 10% | 4% | 10% | 10% | 10% | 10% | 10% |
| Glycerin | 2% | 2% | 2% | 2% | 2% | 2% | 2% |
| Distilled Water | 68.60% | 68.60% | 69.60% | 70.60% | 70.60% | 71.60% | 71.60% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 4.20% | 4.20% | 4.20% | 4.20% | 4.20% | 4.20% | 4.20% |
| Triethyl Citrate |  | 6% |  |  |  |  |  |

TABLE 17

All values are by weight %

|  | EXF-122815-CKTS-50 | EXF-122815-CKTS-51 | EXF-122815-CKTS-53 | EXF-122815-CKTS-54 | EXF-122815-CKTS-55 | EXF-122815-CKTS-58 | EXF-122815-CKTS-59 |
|---|---|---|---|---|---|---|---|
| Total | 100% | 100% | 100% | 100% | 100% | 100% | 100% |
| Geraniol 60 | 4% | 4% |  | 3% | 2% | 4% |  |
| Geraniol 98 |  |  |  |  |  |  | 4% |
| Isopropyl Alcohol | 7% | 5% | 10% | 5% | 5% | 6% | 6% |
| Glycerin | 2% | 2% | 2% | 2% | 2% | 2% | 2% |
| Distilled Water | 71.60% | 71.60% | 75.60% | 72.60% | 73.60% | 71.60% | 71.60% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 4.20% | 4.20% | 4.20% | 4.20% | 4.20% | 4.20% | 4.20% |
| Triethyl Citrate | 3% | 5% |  | 5% | 5% | 4% | 4% |

TABLE 18

All values are by weight %

|  | EXF-122815-CKTS-63 | EXF-122815-CKTS-65 | EXF-122815-CKTS-66 | EXF-122815-CKTS-67 | EXF-122815-CKTS-71 | EXF-122815-CKTS-72 | EXF-122815-CKTS-73 |
|---|---|---|---|---|---|---|---|
| Total | 100% | 100% | 100% | 100% | 100% | 100% | 100% |
| Geraniol 60 | 4.50% | 4.50% | 3.50% | 3.50% | 3% | 4% | 3% |
| Thyme White Oil |  |  | 1% |  |  |  |  |
| Isopropyl Alcohol | 6% | 7% | 7% | 7% | 7% | 7% | 7% |
| Glycerin | 2% | 2% | 2% | 2% | 2% | 2% | 2% |
| Distilled Water | 71.10% | 68.10% | 69.10% | 69.10% | 70.10% | 69.10% | 70.10% |
| Lauric Acid |  | 2% | 1% | 1% | 1% | 1.50% | 1.50% |
| Capric and caprylic acid | 8% | 8% | 8% | 8% | 8% | 8% | 8% |
| Potassium Sorbate | 0.20% | 0.20% | 0.20% | 0.20% | 0.20% | 0.20% | 0.20% |
| 45% KOH Solution | 4.20% | 4.20% | 4.20% | 4.20% | 4.20% | 4.20% | 4.20% |
| Eugenol |  |  |  | 1% | 1.50% |  | 1% |
| Triethyl Citrate | 4% | 3% | 3% | 3% | 3% | 3% | 3% |
| Vanillin |  | 1% | 1% | 1% |  | 1% |  |

TABLE 19

All values are by weight %

|  | EXF-122815-CKTS-74 | EXF-122815-CKTS-76 | EXF-122815-CKTS-56 | EXF-042816-CKTS-11 | EXF-042816-CKTS-12 |
|---|---|---|---|---|---|
| Total | 100% | 100% | 100% | 100% | 100% |
| Geraniol 60 | 3% | 3% | 2% | 2% | 2% |
| Isopropyl Alcohol | 7% | 7% | 5% | 7% | 10% |
| Glycerin | 2% | 2% | 2% | 2% | 2% |
| Distilled Water | 71.10% | 71.60% | 73.60% | 72.60% | 72.60% |

TABLE 19-continued

| | EXF-122815-CKTS-74 | EXF-122815-CKTS-76 | EXF-122815-CKTS-56 | EXF-042816-CKTS-11 | EXF-042816-CKTS-12 |
|---|---|---|---|---|---|
| All values are by weight % | | | | | |
| Lauric Acid | 1.50% | 1% | | 1% | 1% |
| Capric and caprylic acid | 8% | 8% | 8% | 7% | 7% |
| Potassium Sorbate | 0.20% | 0.20% | 0.20% | 0.20% | 0.20% |
| 45% KOH Solution | 4.20% | 4.20% | 4.20% | 4.20% | 4.20% |
| Eugenol | | | | 1% | 1% |
| Triethyl Citrate | 3% | 3% | 5% | 3% | |

The protocol used for making the formulations using the ingredients listed in Tables 1-15 is as follows. Mixing occurs throughout the addition of all ingredients:

Step 1—Add isopropyl alcohol ("IPA", solvent) or fatty acid;
Step 2—Add IPA (solvent) or fatty acid;
Step 3—Add oils (Geraniol 60 and Peppermint Oil);
Step 4—Add other ingredients (e.g., glycerin and potassium sorbate);
Step 5—Add distilled water; and
Step 6—Add KOH solution.

The amount of KOH added was less than required to fully saponify the mixture of ingredients. As such, the resulting formulations were partially saponified. Samples of the test material were measured for pH using a pH meter. Samples were placed in tightly sealed glass vials and stored at the indicated temperature for 24 hours. The glass vials were returned to room temperature and visually examined for color, clarity, and homogeneity. For freeze/thaw cycles, samples were placed in a freezer at −18° C. for 1 h and returned to room temperature, 3 times. Samples were designated "stable" if no physical change in the sample was noted upon returning to room temperature; physical changes at the test temperature were also noted. Stability characteristics of the partially saponified formulations produced by the above protocol are listed in Table 20 below.

TABLE 20

| | TT6034 | EXF-070915-CKTS-42 | EXF-063016-CKTS-1 | EXF-042816-CKTS-14 | EXF-042816-CKTS-2 |
|---|---|---|---|---|---|
| Room Temperature | Stable | Stable | Stable | Stable | Stable |
| Refrigerated @ 8° C. | Stable (liquid) | Stable (liquid) | Stable (liquid) | Stable (liquid) | Stable (liquid) |
| Heated @ 40° C. | Stable | Stable | Stable | Stable | Stable |
| Freeze/Thaw Cycles | Stable (freezes) | Stable (freezes) | Stable (freezes) | Stable (freezes) | Stable (freezes) |
| pH Values | 7.05 | 7.18 | 7.76 | | 7.0 |
| Separates? | Cloudy | | | | |
| When (hr)? | 24 hr @ 6 C. | | | | |

The partially saponified formulations also were characterized for compatibility and aesthetic qualities, (e.g., staining, and the propensity of causing physical damage). A sample of the material to be tested was secured to a testing stand using a clamp. TT-6034 or EXF-070915-CKTS-42 was applied to the test material using a trigger sprayer from a distance of 12 inches from the material surface (1.3 ml/pull, three pulls). Application was repeated 24 and 48 hours after the first application. After 7 days, the material was evaluated, then cleaned using a method appropriate to the material (e.g. in a washing machine with detergent according to manufacturer's directions for washable fabrics), and evaluated again. Damage to the material (staining, discoloration, physical degradation) was evaluated visually on a scale of 0-5, with 0 indicating no evident damage and 5 indicating destruction of the material and permanent staining. The results of the compatibility and aesthetic qualities characterization are given for the final partially saponified formulation, TT6034, below in Table 21.

The rating system reflected in the table is as follows: Scale 1-5; 1=No Issues; 5=Very Problematic.

TABLE 21

| | | TT6034 | EXF-070915-CKTS-42 |
|---|---|---|---|
| Physical Damage - Average | Leather Belt 1 | 1 | 1 |
| | Leather Belt 2 | 1 | 1 |
| | Fleece | 1 | 1 |
| | Wool | 1 | 1 |
| | Cotton | 1 | 1 |
| | Polyester | 1 | 1 |
| | Denim | 1 | 1 |
| | Nylon | 1 | 1 |
| | Neopren | 1 | 1 |
| | Poly/Cotton | 1 | 1 |
| Staining - Average | Leather Belt 1 | 1.5 | 1.5 |
| | Leather Belt 2 | 2.5 | 2 |
| | Fleece | 1.5 | 1 |
| | Wool | 2.5 | 2.5 |
| | Cotton | 1 | 1 |
| | Polyester | 1 | 1 |
| | Denim | 1 | 1 |

TABLE 21-continued

| | | TT6034 | EXF-070915-CKTS-42 |
|---|---|---|---|
| | Nylon | 1.5 | 1.5 |
| | Neopren | 1 | 1 |
| | Poly/Cotton | 1 | 1 |
| Aesthetics | Odor | 2 | 1 |
| | Residue | 1 | 1 |
| | Stain | 1 | 1 |
| | Foam | 2 | 2 |
| | Greasy | 2 | 2 |

The partially saponified formulations, TT6034, EXF-070915-CKTS-42, EXF-063016-CKTS-1, EXF-042816-

CKTS-14 and EXF-042816-CKTS-2, were tested for surfactant properties by observing the spray pattern resulting in the application of the formulation onto a surface substrate. A spray pattern sheet consisting of dark colored construction paper printed with X- and Y-axes was placed into a testing rig. Test material was applied to the spray pattern sheet with a single pull from a trigger sprayer, held 12 inches from the surface of the test sheet. Immediately following application, the inner circle, outer circle, and over spray of the applied material were outlined in pencil. The diameter of the outer circle was measured and the spray pattern distribution assessed visually for evenness and regularity. The results for the surfactant data collected for five formulations, including TT6034, EXF-070915-CKTS-42, EXF-063016-CKTS-1, EXF-042816-CKTS-14, and EXF-042816-CKTS-2, are presented below in Table 22.

TABLE 22

|  | TT6034 | EXF-070915-CKTS-42 | EXF-063016-CKTS-1 | EXF-042816-CKTS-14 | EXF-042816-CKTS-2 |
| --- | --- | --- | --- | --- | --- |
| Spray Pattern Production Trigger | Good Even Distribution (8" diam) | Good Even Distribution (8" diam) | Good Even Distribution (8" diam) | Good Even Distribution (8" diam) | Good Even Distribution (8" diam) |

Testing Procedures

Repellency studies were conducted with the partially saponified formulation TT6034 (see Table 1, 3.5% geraniol and 0.5% peppermint oil).

For house fly (*Musca domestica* (L.)) tests, one hundred adult flies, aged 3-7 days, were placed in a square 73.66× 73.66×73.66 cm cage. The flies were allowed to acclimate for one hour before testing started. The floor of the cage was divided into four quadrants, and after one hour two bait stations were introduced into the cage, one control and one treatment station. The bait stations were fitted with filter paper testing surfaces; the paper testing surface of the treatment station was treated with 500 □L of the partially saponified formulation TT6034 and the control was untreated. The partially saponified formulation TT6034 samples used in testing were either freshly synthesized formulations or from formulations that were aged by 24 hours or more, ranging from one day to a few weeks from the date of synthesis. The bait used for this experiment was a mixture of powdered milk, sugar, and water. The treatment station was placed in a randomly assigned quadrant with the control station being placed diagonally across from the treated station. A webcam was set up in each cage which captured three pictures (10 sec apart) every hour. The pictures were recorded on a computer connected to the webcam. These pictures were then reviewed and the number of flies on each station at every hour was recorded. These same steps were repeated for stable fly (*Stomoxys calcitrans* (L.)) tests, with the only difference being that citrated bovine blood was used instead of the previous bait mixture.

Data Analysis and Results

Percent repellency was calculated using the formula described above, averaged over the number of trials. As shown in Table 23 below, the results of the experiments using the partially saponified formulations TT6034, EXF-122815-CKTS-52, EXF-070915-CKTS-1, and EXF-070915-CKTS-9 resulted in at least 90% repellency for a duration of at least 4 hours.

TABLE 23

| House Flies (90+ % repellency) | | | |
| --- | --- | --- | --- |
| Formulation Number | Total # reps | Total # trials | *Musca Domestica* |
| TT6034 | 8 | 3 | 4 hours |
| EXF-070915-CKTS-42 | 4 | 1 | 3 hours |
| EXF-122815-CKTS-52 | 3 | 1 | 4 hours |
| EXF-122815-CKTS-60 | 3 | 1 | 3 hours |
| EXF-122815-CKTS-61 | 2 | 1 | 2 hours |
| EXF-122815-CKTS-70 | 2 | 1 | 5 hours |
| EXF-070915-CKTS-1 | 2 | 1 | 4 hours |
| EXF-070915-CKTS-9 | 2 | 1 | 4 hours |
| EXF-070915-CKTS-11 | 2 | 1 | 4 hours |
| EXF-070915-CKTS-17 | 2 | 1 | 2 hours |
| EXF-070915-CKTS-18 | 2 | 1 | <1 hour |
| EXF-070915-CKTS-19 | 2 | 1 | 1 hour |
| EXF-070915-CKTS-28 | 3 | 1 | 3 hours |
| EXF-070915-CKTS-29 | 1 | 1 | <1 hour |
| EXF-070915-CKTS-30 | 1 | 1 | 1 hour |
| EXF-070915-CKTS-31 | 7 | 2 | 3 hours |
| EXF-070915-CKTS-32 | 1 | 1 | 2 hours |
| EXF-070915-CKTS-48 | 3 | 1 | 2 hours |
| EXF-122815-CKTS-29 | 3 | 1 | 4 hours |
| EXF-122815-CKTS-36 | 3 | 1 | 5 hours |
| EXF-122815-CKTS-38 | 3 | 1 | 5 hours |
| EXF-122815-CKTS-41 | 3 | 1 | 5 hours |
| EXF-122815-CKTS-42 | 3 | 1 | 5 hours |
| EXF-122815-CKTS-43 | 3 | 1 | 5 hours |
| EXF-122815-CKTS-45 | 3 | 1 | 5 hours |
| EXF-122815-CKTS-46 | 3 | 1 | 5 hours |
| EXF-122815-CKTS-48 | 3 | 1 | 4 hours |
| EXF-122815-CKTS-49 | 3 | 1 | 5 hours |
| EXF-122815-CKTS-50 | 3 | 1 | 5 hours |
| EXF-122815-CKTS-51 | 3 | 1 | 5 hours |
| EXF-122815-CKTS-53 | 3 | 1 | <1 hour |
| EXF-122815-CKTS-54 | 3 | 1 | 1 hour |
| EXF-122815-CKTS-55 | 3 | 1 | 3 hours |
| EXF-122815-CKTS-58 | 3 | 1 | 2 hours |
| EXF-122815-CKTS-59 | 3 | 1 | 2 hours |
| EXF-122815-CKTS-63 | 3 | 1 | 3 hours |
| EXF-122815-CKTS-65 | 2 | 1 | 5 hours |
| EXF-122815-CKTS-66 | 2 | 1 | 3 hours |
| EXF-122815-CKTS-67 | 2 | 1 | 2 hours |
| EXF-122815-CKTS-71 | 2 | 1 | 5 hours |
| EXF-122815-CKTS-72 | 2 | 1 | 5 hours |
| EXF-122815-CKTS-73 | 4 | 2 | 5 hours |
| EXF-122815-CKTS-74 | 2 | 1 | 5 hours |
| EXF-122815-CKTS-76 | 3 | 1 | 6 hours |
| EXF-042816-CKTS-1 | 3 | 1 | 3 hours |
| EXF-042816-CKTS-2 | 3 | 1 | 3 hours |
| EXF-042816-CKTS-3 | 2 | 1 | 3 hours |
| EXF-042816-CKTS-4 | 2 | 1 | 2 hours |
| EXF-042816-CKTS-8 | 3 | 1 | 3 hours |
| EXF-042816-CKTS-10 | 3 | 1 | 5 hours |
| EXF-042816-CKTS-11 | 3 | 1 | 3 hours |

TABLE 23-continued

House Flies
(90+ % repellency)

| Formulation Number | Total # reps | Total # trials | *Musca Domestica* |
|---|---|---|---|
| EXF-042816-CKTS-12 | 3 | 1 | 1 hour |
| EXF-063016-CKTS-1 | 3 | 1 | 5 hour |
| EXF-042816-CKTS-14 | 3 | 1 | 4 hour |

FIG. 1 is a graph plotting the percent repellency of house fly lands per minute on bait stations treated with TT6034, EXF-063016-CKTS-1, EXF-042816-CKTS-2, or EXF-042816-CKTS-14 over time, as calculated using the formula in paragraph [0024]. As shown in FIG. 1, TT6034, EXF-063016-CKTS-1, EXF-042816-CKTS-2, or EXF-042816-CKTS-14 afforded >90% repellency of house fly lands for at least 4 hours.

Figure 2:
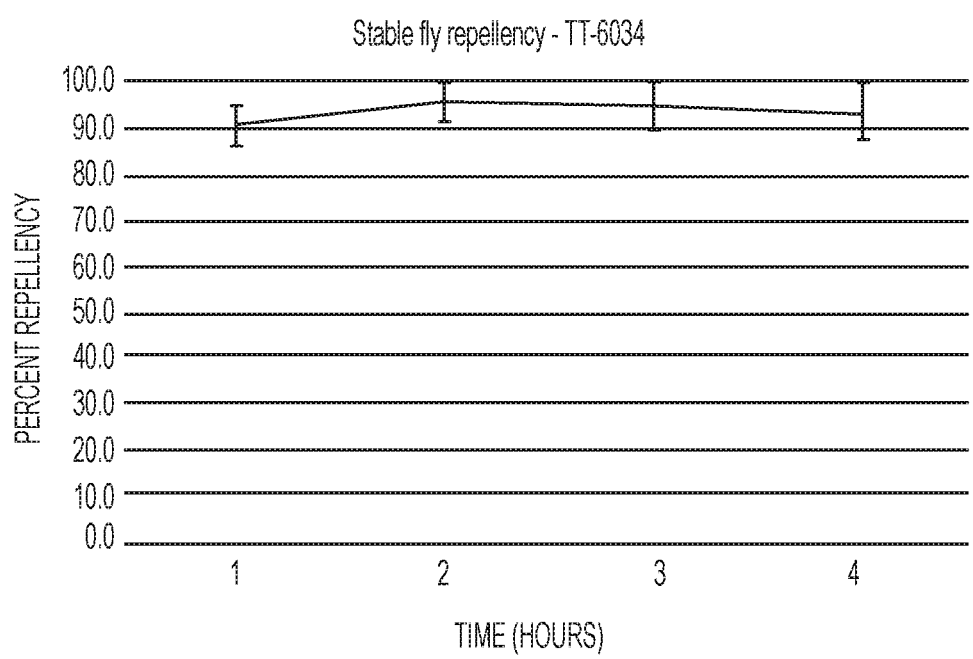
FIG. 2 depicts a graph including data from a trial to assess arthropod repellency over time for a test formulation, and wherein the graph plots percent repellency versus time (hours).

Hourly percent repellency data for TT6034, EXF-063016-CKTS-1, EXF-042816-CKTS-2, or EXF-042816-CKTS-14 are presented in FIG. 1, where it can be seen that all four tested formulations provided >90% repellency for at least 4 hours. For TT-6034, % repellency ranged from 99% repellency at 1 hour to 90% repellency at 4 hours. For EXF-063016-CKTS-1, % repellency ranged from 100% repellency at 1 hour to 92% repellency at 5 hours. For EXF-042816-CKTS-2, % repellency ranged from 100% repellency at 1 hour to 98% repellency at 5 hours. For EXF-042816-CKTS-14, % repellency ranged from 100% repellency at 1 hour to 92% repellency at 4 hours Hourly percent repellency data for TT6034 for each stable fly trial are presented in FIG. 2. FIG. 2 shows the mean number of stable fly lands per minute on bait stations treated with TT6034 over time in 4 repetitions of the trial (n=4 reps). Percent repellency ranged from 90% at 1 hour to 93.8% at 4 hours post-treatment.

Formulation plays a key role in extending duration of repellency. The TT6034, EXF-063016-CKTS-1, EXF-042816-CKTS-2, and EXF-042816-CKTS-14 formulations used in this example are novel plant-based repellent formulations containing 2-3.5% geraniol and 0.5-2% peppermint. TT6034, EXF-063016-CKTS-1, EXF-042816-CKTS-2, and EXF-042816-CKTS-14 provided significant repellency on treated bait stations for 4 h compared to untreated controls.

Example 2

Repellent Activity of the Plant-Based Repellents, TT6034, EXF-063016-CKTS-1, EXF-042816-CKTS-2, and EXF-042816-CKTS-14 Against the Ticks *Amblyomma americanum, Dermacentor variabilis*, and *Ixodes scapularis* (Acari: Ixodidae)

Materials and Methods
Ticks. Three species of ticks were used in the laboratory bioassays, *A. americanum, D. variabilis*, and *I. scapularis*. Naive, unfed, adult, host-seeking (as evidenced by raised forelegs in reaction to the investigator's breath) mixed-sex ticks were used in all laboratory bioassays. All ticks were purchased from the University of Oklahoma Tick Lab. Ticks used in repellency studies were held in plastic vials at 28° C., approximately 80% relative humidity, and with a photoperiod of 15 hours light: 9 hours dark.

Test Substances
Laboratory tick repellency bioassays were conducted with TT6034 (3.5% geraniol, 0.5% peppermint, by weight, TyraTech, Inc., Morrisville, N.C.), EXF-063016-CKTS-1 (3.5% geraniol, 0.5% peppermint, by weight, TyraTech, Inc., Morrisville, N.C.), EXF-042816-CKTS-2 (2% geraniol, 2% peppermint, by weight, TyraTech, Inc., Morrisville, N.C.), and EXF-042816-CKTS-14 (2% geraniol, 2% peppermint, by weight, TyraTech, Inc., Morrisville, N.C.). The partially saponified formulations, (see Tables 1-19) are described in detail in Example 1 above.

Testing Procedures
Two (31.8 cm$^2$) semi-circular filter paper (Whatman no. 1) surfaces were used, one untreated (control) and the other treated with 250 μL of TT6034, EXF-063016-CKTS-1, EXF-042816-CKTS-2, or EXF-042816-CKTS-14.

Choice trials were conducted at 3 hours after repellent application. Briefly, ticks chose between the two semi-circular filter paper surfaces, one untreated and the other treated with one of the partially saponified formulations, TT6034, EXF-063016-CKTS-1, EXF-042816-CKTS-2, or EXF-042816-CKTS-14. Paper surfaces were treated in separate glass Petri dishes and were allowed to dry under a fume hood for 2.5 hours before beginning the bioassays. At the beginning of each bioassay, papers were transferred to separate plastic Petri dish lids and six ticks were positioned along the junction where the treated and untreated surfaces met. An O-ring (3 mm width, 80 mm inner diameter, McMaster-Carr, Robbinsville, N.J.) was placed on top of the papers, creating a 3 mm gap between the Petri dish lid and the inverted bottom of the Petri dish, thereby allowing ticks to move freely within the arena without being able to turn over or avoid contact with the filter paper substrate. Distribution of ticks was recorded 30 minutes after introduction of ticks to the arena (3 hours post repellent treatment). Tests were conducted at 30° C., approximately 60% relative humidity, under ambient (fluorescent) light. Ticks were allowed to acclimate to testing conditions for 30 minutes before beginning bioassays.

Percent repellency was calculated as discussed above. The expected distribution of ticks on filter paper in the absence of a repellent formulation was 0.5 (half of the ticks distributed on each side of the test arena). The results of the data analysis are provided in Table 24 below:

TABLE 24

| | | TT6034 4 hours | EXF-070915-CKTS-42 3 hours | EXF-042816-CKTS-2 3 hours | EXF-063016-CKTS-1 3 hours | EXF-042816-CKTS-14 3 hours |
|---|---|---|---|---|---|---|
| Ticks (90+ % repellency @ 3 hr) | Total # reps | 3 | 3 | 3 | 3 | 3 |
| | Total # trials | 1 | 1 | 1 | 3 | 3 |
| | *Amblyomma americanum* | 100% | 100% | 94% | 100 | 100 |
| | Total # reps | 3 | 3 | 3 | 3 | 3 |
| | Total # trials | 1 | 1 | 1 | 3 | 3 |

TABLE 24-continued

|  | TT6034 4 hours | EXF-070915-CKTS-42 3 hours | EXF-042816-CKTS-2 3 hours | EXF-063016-CKTS-1 3 hours | EXF-042816-CKTS-14 3 hours |
| --- | --- | --- | --- | --- | --- |
| *Dermacentor variabilis* | 94% | 100% | 100% | 94 | 94 |
| Total # reps | 3 | 3 | 3 | 3 | 3 |
| Total # trials | 1 | 1 | 1 | 3 | 3 |
| *Ixodes scapularis* | 100% | 100% | 94% | 100 | 100 |

Figure 3:
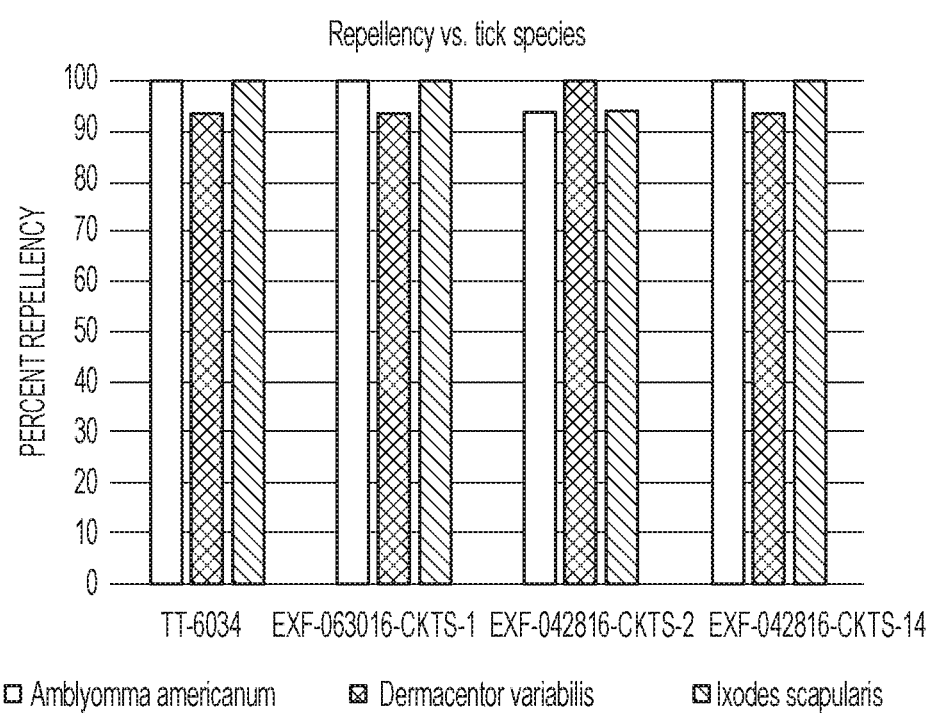
FIG. 3 depicts a graph including data from a trial to assess repellency against the tick species *Amblyomma americanum*, *Dermacentor variabilis*, and *Ixodes scapularis* on surfaces treated with test formulations.

The goal of the present study was to evaluate the activity of TT6034, EXF-063016-CKTS-1, EXF-042816-CKTS-2, and EXF-042816-CKTS-14 against three species of ticks in laboratory bioassays. Percent repellencies (±1 SEM) against three species of ticks (n=3 replicates of 6 ticks each) for the TT6034, EXF-063016-CKTS-1, EXF-042816-CKTS-2, or EXF-042816-CKTS-14 treated filter paper compared to untreated filter paper are presented in FIG. 3. TT6034, EXF-063016-CKTS-1, EXF-042816-CKTS-2, and EXF-042816-CKTS-14 provided approximately 94% or greater repellency to all three species of ticks 3 hours after application to filter paper. Approximately 44% of ticks were distributed on either side of the test arena for untreated controls, demonstrating a lack of repellency.

Example 3

Repellency of the Plant-Based Repellent TT6034, EXF-063016-CKTS-1, EXF-042816-CKTS-2, and EXF-042816-CKTS-14 Against Mosquitoes in the Laboratory Materials and Methods Humans were used as surrogates for horses in studies examining mosquito repellency of TT6034, EXF-063016-CKTS-1, EXF-042816-CKTS-2, and EXF-042816-CKTS-14. The use of humans in a laboratory setting allowed testing the materials under high mosquito pressure, in controlled environmental conditions, and using a host that emits host cues, rather than an artificial system.

Mosquitoes. An *Aedes aegypti* (L.) colony was established from eggs provided by the USDA (Gainesville, Fla.) in 2007. The colony was supplemented with mosquitoes purchased as larvae from Benzon Research (Carlisle, Pa.) in 2012 to maintain genetic diversity. *Anopheles quadrimaculatus* were purchased as adults from Benzon Research. Mosquitoes were maintained in an insectary at 28±2° C., approximately 55% relative humidity, and a photoperiod of 12 hours light: 12 hours dark. Adult females used in repellency bioassays were fed 10% sucrose solution and water ad libitum prior to experiments and were never provided a bloodmeal. All mosquitoes were certified to be disease free. Tests were conducted between 09:00 and 16:00.

Test Substances

Laboratory mosquito repellency bioassays were conducted with the partially saponified formulations TT6034, EXF-063016-CKTS-1, EXF-042816-CKTS-2, or EXF-042816-CKTS-14, described in detail in Example 1 above.

Testing Procedures

All human volunteers provided written informed consent before beginning the study. The testing protocol was adapted from the Environmental Protection Agency's (US EPA, 2010) Product Performance Test Guidelines, Insect Repellents to be applied to Human Skin. The test area was the volunteer's forearm from the elbow to the wrist. The surface area of subject's limb in $cm^2$ was estimated by measuring the circumference of the forearm at the wrist and elbow and at two equally spaced intermediate points; then multiplying the average circumference by the length of the limb from the wrist to elbow. One arm was treated with a test substance and the other remained untreated, serving as the control. Before repellent application, the test area was sprayed with 70% ethanol, by volume, until damp and then dried with a clean paper towel. One arm was treated with a test substance and the other remained untreated, serving as the control. Control arms were cleaned using the same method. The test substance was applied to human skin at a rate of 1 ml/600 $cm^2$. During testing, nitrile gloves were worn to protect the hands from mosquito bites.

For each test, 80 unmated, host-seeking adult female mosquitoes aged 5-10 days were placed in a square 45.7× 45.7×45.7 cm cage with a sleeved opening at the front for insertion of the volunteer's forearm. On each testing day, each subject used a separate test cage containing naive mosquitoes. Landing counts were taken at 30 minute intervals beginning 30 minutes after repellent application until ≤90% repellency was observed. A landing was defined as a mosquito resting on the surface of the volunteer's arm for ≥2 seconds. At each testing time point, the control arm was inserted into the cage and the number of landings was recorded by the study conductor for 1 minute. The treated arm was then inserted for the same time period and the number of landings was recorded. The same observer recorded landings for all tests and instructed volunteers to move the arm periodically to avoid blood-feeding. The landing count minimum was five mosquitoes per minute on the control arm. Test procedures were repeated two times for *Ae. aegypti* and three times for *An. quadrimaculatus* using different volunteers for each replicate. Male to female ratio among volunteers was 2:0 for trials using *Ae. aegypti* and 3:0 *An. quadrimaculatus*.

Data Analysis and Results

Figure 4:
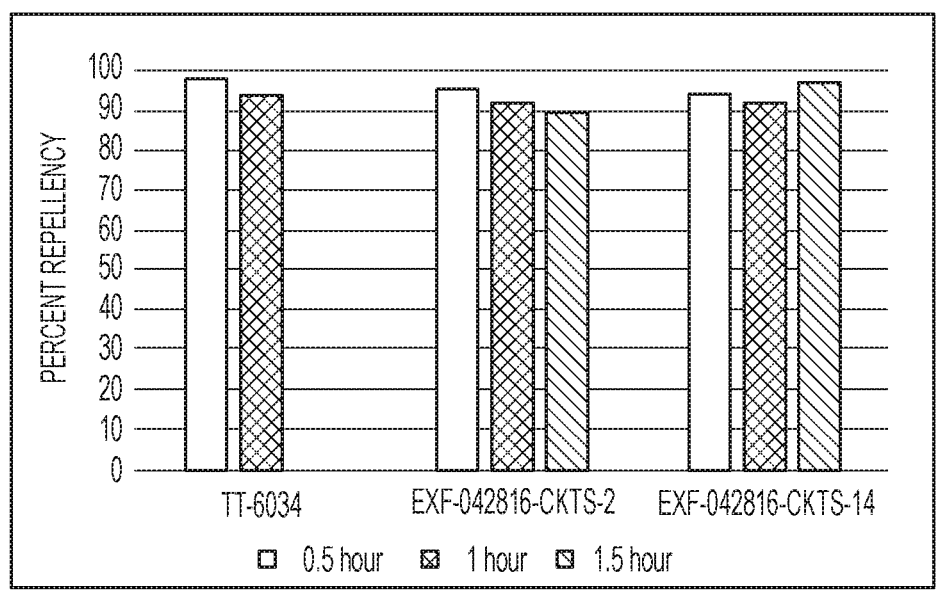
FIG. 4 depicts a graph including data from a trial to assess repellency against the mosquito species *Ae. aegypti* in which human volunteers' arms were treated with a test formulation, and wherein the graph plots mean repellency versus time post-treatment (hours).
Figure 5:
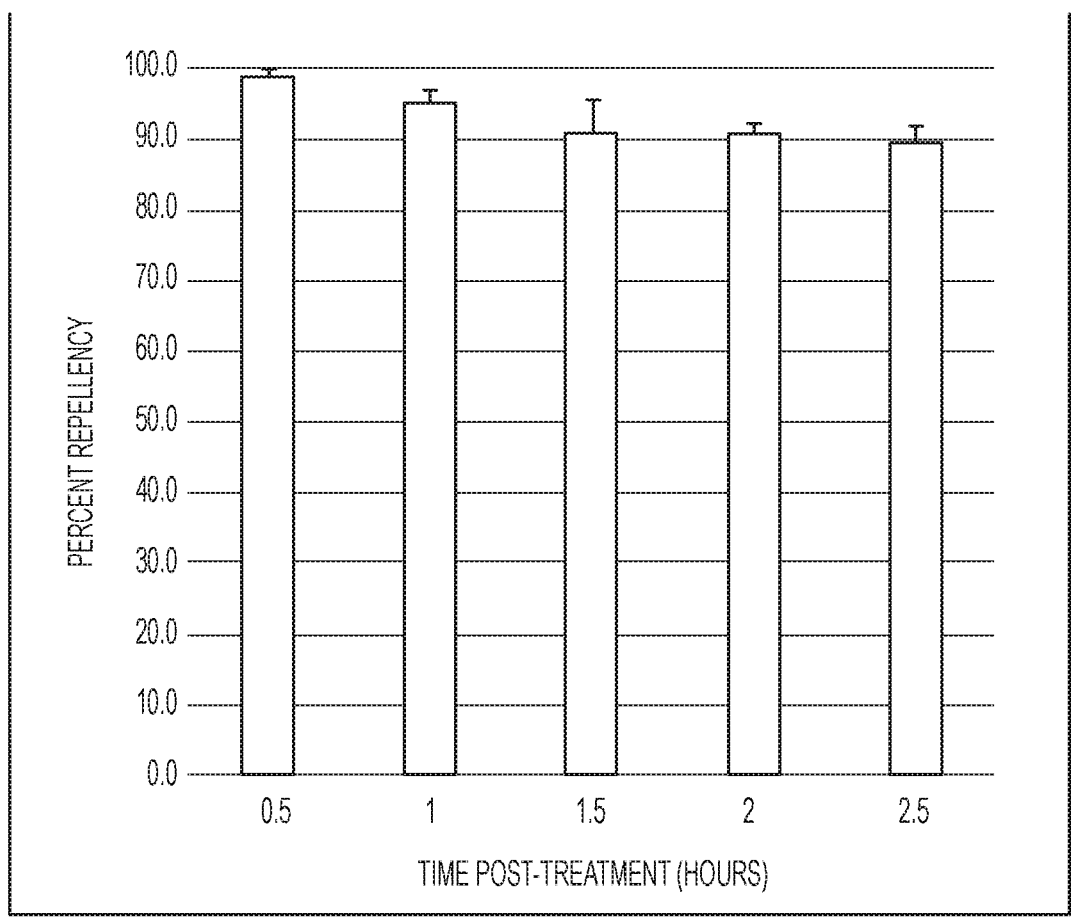
FIG. 5 depicts a graph including data from a trial to assess repellency against the mosquito species *An. quadrimaculatus* in which human volunteers' arms were treated with a test formulation, and wherein the graph plots mean repellency versus time post-treatment (hours).

Percent repellency was calculated. Percent repellency results for formulations TT6034, EXF-042816-CKTS-2, and EXF-042816-CKTS-14 against *Ae. aegypti* and against *An. quadrimaculatus* for TT6034 are presented in FIGS. 4 and 5. FIG. 4 shows that repellency against *Ae. aegypti* was >90% at 0.5 hour and at 1 hour post-application for TT6034, and >90% at 0.5, 1 and 1.5 hours for EXF-042816-CKTS-2 and EXF-042816-CKTS-14. However, repellency of TT6034 against *An. quadrimaculatus*, as shown in FIG. 5, remained above 90% for 2.5 hours.

The results for the partially saponified formulations, including TT6034, EXF-042816-CKTS-2, and EXF-042816-CKTS-14 against *Ae. aegypti* are shown in Table 25 below.

TABLE 25

| Formulation Number | Total # reps | Total # trials | Aedes aegypti |
|---|---|---|---|
| TT6034 | 2 | 1 | 1.5 hours |
| EXF-070915-CKTS-42 | 2 | 1 | 1 hour |
| EXF-122815-CKTS-52 | 1 | 1 | <1 hour |
| EXF-122815-CKTS-60 | 1 | 1 | 0.50 hours |
| EXF-122815-CKTS-61 | 1 | 1 | 0.50 hours |
| EXF-122815-CKTS-70 | 1 | 1 | 1 hour |
| EXF-122815-CKTS-56 | 1 | 1 | 0.50 hours |
| EXF-042816-CKTS-2 | 3 | 1 | 1.5 hours |
| EXF-042816-CKTS-14 | 3 | 1 | 1.5 |

Mosquitos (90+ % repellency)

Example 4

Repellency of the Plant-Based Repellent EXF-042816-CKTS-2 Against Flies in a Calve Study Test Substances Repellency studies were conducted with the partially saponified formulation EXF-042816-CKTS-2 (2% geraniol and 2% peppermint oil) described above, and a commercially available product ("Commercial Standard") including 0.1% thyme oil, 0.05% cedar oil, 0.05% lemongrass oil, 0.05% citronella oil, 0.08% clove oil, 0.7% geraniol, 2.50% sodium lauryl sulfate, glycerin, Vitamin E, and water.

Test Procedures

Calves were randomly assigned a treatment using a random number generator (www.random.org) on day 1 of the trial, and treatments were rotated on subsequent days so that each calf received each treatment or a control (water) only once. There were 19 calves tested on day 1 and 15 tested on day 2. The test area of a calf was the surface of the upper leg from parallel to the belly to the fetlock. During the study, calves were housed in separate but similar poly hutches with a wire enclosure, and spray application took place within each separate enclosure. Test substances were applied with identical hand-pumped trigger sprayers that dispensed 1.3 mL/pull, at a rate of 4.4 mL/leg (4 sprays per leg with approx. 15% overspray (estimated in the laboratory)). The estimated assemblage of fly species present at the study location were stable flies (*S. calcitrans*) and house flies (*M. domestica*) in an approximate 4:1 ratio, respectively. Stable and house fly landing counts were conducted over a period of 1 min at 30 min intervals for 6 h after treatment. A landing was defined as a fly resting on the surface of the leg for ≥2 sec. Two observers, one on either side of a calf body, recorded fly lands using hand-held mechanical counters during each one-minute observation period.

Data Analysis

Mean percent repellency was calculated using the formula:

$$\frac{(\text{control count} - \text{treatment count})}{\text{control count}} \times 100$$

Probability of differences were calculated to determine whether differences in fly numbers exist among the treatments and the control at each time point and across all time points using Fisher least squares difference (wherein SEM is the standard error of the mean) in the statistical analysis software program ANALYSE-IT v3.90.2. LSD tests for least squares mean (LSM) repellencies under the hypothesis H0: LSM(i)=LSM(j).

Results

Figure 6:
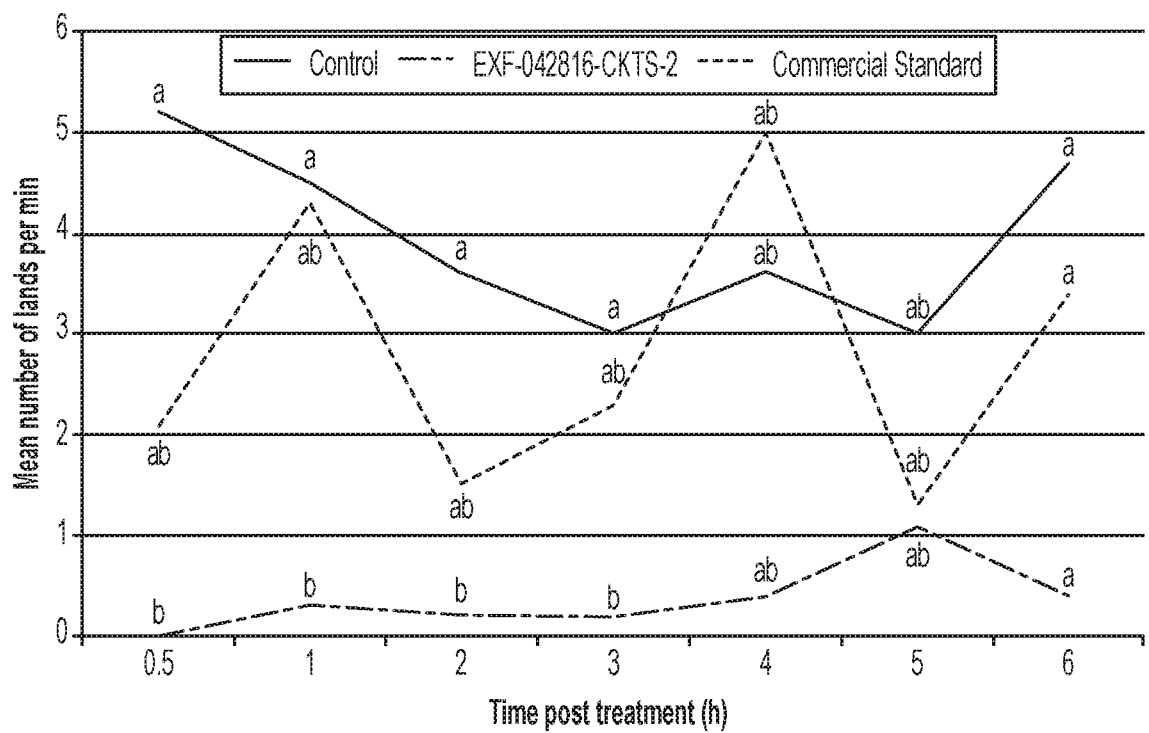
FIG. 6 depicts a graph showing test results from the calve trial of Example 4, wherein the graph plots mean number of fly lands on treated regions per minute versus time post-treatments (hours).

FIG. 6 is a plot of the mean number of fly lands per minute on calf legs treated with EXF-042816-CKTS-2, Commercial Standard, and water (control) over time in the calf study for the trials conducted (n=9 calves per treatment). Lands were significantly lower on calves treated with EXF-042816-CKTS-2 versus water-treated (control) calves at hourly observational time points through 3 hours post treatment. (LSD, P<0.05). For EXF-042816-CKTS-2, the average number of fly lands per calf was less than 1 for every observation except the 5 hour reading. In FIG. 6, means for each time point with the same letter are not significantly different (P≤0.05, LSD; ANALYSE-IT). The numbers of fly lands were not significantly different between the Commercial Standard and water-treated calves at any of the observed time points. Mean percentage repellency data for EXF-042816-CKTS-2 and the Commercial Standard when used on calves at post-application time points (h) are presented in the following table, wherein SEM is the standard error of the mean.

TABLE 26

| | Mean Percentage Repellency (%) | | | |
|---|---|---|---|---|
| Time post-treatment (h) | EXF-042816-CKTS-2 | SEM | Commercial Standard | SEM |
| 1 | 92.9 | 7.1 | 0 | 45.8 |
| 2 | 93.2 | 2.3 | 49.8 | 10.4 |
| 3 | 92.5 | 0.8 | 22.2 | 11.1 |
| 4 | 88.1 | 4.8 | 0 | 55.7 |
| 5 | 58.8 | 22.4 | 58 | 8 |
| 6 | 92.3 | 7.7 | 24.7 | 8 |

Mean percentage repellency values <0 are reported as 0.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112, first paragraph, and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

What is claimed is:

1. A formulation for controlling arthropods, wherein the formulation is provided by fully or partially saponifying a mixture comprising, by weight based on total weight of the mixture:
   6% to 10% fatty acid, wherein the fatty acid in the mixture consists of one or both of capric acid and caprylic acid;
   1.5% to 7.0% geraniol; and
   0.5% to 4.0% peppermint oil;
   wherein the formulation comprises fatty acid salts, and the fatty acid salts in the formulation consist of one or both of capric acid salt and caprylic acid salt.

2. The formulation of claim 1, wherein the mixture comprises, by weight based on total weight of the mixture:
   6% to 10% fatty acid, wherein fatty acid in the mixture consists of one or both of capric acid and caprylic acid;
   1.5% to 5% geraniol; and
   0.5% to 3% peppermint oil.

3. The formulation of claim 1, further comprising isopropyl alcohol.

4. The formulation of claim 1, further comprising glycerin.

5. The formulation of claim 1, further comprising an alkali salt.

6. The formulation of claim 5, wherein the alkali salt comprises potassium hydroxide.

7. A formulation for controlling arthropods, the formulation provided by fully or partially saponifying a mixture comprising, in weight percentages based on total mixture weight:
   6% to 10% fatty acid, wherein fatty acid in the mixture consists of one or both of capric acid and caprylic acid;
   1.5% to 6.0% geraniol; and
   0.5% to 4.0% peppermint oil;
   wherein the formulation comprises fatty acid salts, and the fatty acid salts in the formulation consist of one or both of capric acid salt and caprylic acid salt.

8. The formulation of claim 7, wherein the geraniol comprises Geraniol 60.

9. The formulation of claim 7, wherein the geraniol comprises Geraniol 98.

10. The formulation of claim 7, wherein the mixture comprises:
    6% to 10% fatty acid, wherein fatty acid in the mixture consists of one or both of capric acid and caprylic acid;
    1.5% to 6.0% geraniol; and
    0.5% to 3% peppermint oil.

11. The formulation of claim 10, wherein the geraniol comprises Geraniol 60.

12. The formulation of claim 10, wherein the geraniol comprises Geraniol 98.

13. The formulation of claim 7, wherein the formulation is 60% to 100% saponified.

14. The formulation of claim 7, wherein the formulation is 60% to 90% saponified.

15. The formulation of claim 7, wherein the capric acid and caprylic acid are present, by weight, in a ratio of 4:1 in the mixture.

16. The formulation of claim 7, wherein the capric acid and caprylic acid are present, by weight, in a ratio of 1:4 in the mixture.

17. The formulation of claim 7, further comprising glycerin.

18. The formulation of claim 7, further comprising potassium hydroxide.

19. The formulation of claim 7, further comprising at least one of isopropyl alcohol, glycerin, water, potassium hydroxide, and potassium sorbate.

20. A formulation for controlling arthropods, wherein the formulation is a partially saponified mixture, the mixture comprising, based on total mixture weight before saponification:
    6% to 10% fatty acid,
    wherein fatty acid in the mixture consists of one or both of capric acid and caprylic acid;
    1.5% to 7.0% geraniol; and
    0.5% to 4.0% peppermint oil;
    wherein the formulation comprises fatty acid salts, and the fatty acid salts in the formulation consist of one or both of capric acid salt and caprylic acid salt.

21. The formulation of claim 20, wherein the mixture comprises, in weight percentages based on total mixture weight before saponification:
    6% to 10% fatty acid, wherein the fatty acid in the mixture consists of one or both of capric acid and caprylic acid;
    1.5% to 5% geraniol; and
    0.5% to 3% peppermint oil.

22. The formulation of claim 20, further comprising isopropyl alcohol.

23. The formulation of claim 20, further comprising glycerin.

24. The formulation of claim 20, further comprising an alkali salt.

25. The formulation of claim 24, wherein the alkali salt comprises potassium hydroxide.

26. A method for making a formulation for controlling arthropods, the method comprising:
  providing a mixture comprising, by weight based on total weight of the mixture,
    6% to 10% fatty acid, wherein fatty acid in the mixture consists of one or both of capric acid and caprylic acid,
    1.5% to 7.0% geraniol, and
    0.5% to 4.0% peppermint oil; and
  at least partially saponifying the mixture;
  wherein the formulation comprises fatty acid salts, and the fatty acid salts in the formulation consist of one or both of capric acid salt and caprylic acid salt.

27. The method of claim 26, wherein the mixture comprises, by total weight of the mixture:
  6% to 10% fatty acid, wherein fatty acid in the mixture consists of one or both of capric acid and caprylic acid;
  1.5% to 5% geraniol; and
  0.5% to 3% peppermint oil.

28. The method of claim 26, wherein the formulation further comprises isopropyl alcohol.

29. The method of claim 26, wherein the formulation further comprises glycerin.

30. The method of claim 26, wherein the formulation further comprises an alkali salt.

31. The method of claim 30, wherein the alkali salt comprises potassium hydroxide.

32. The method of claim 26, wherein the geraniol comprises Geraniol 60.

33. The method of claim 26, wherein the geraniol comprises Geraniol 98.

34. The method of claim 26, wherein at least partially saponifying the mixture comprises saponifying the mixture sufficiently to result in a formulation that is 60% to 100% saponified.

35. The method of claim 26, wherein at least partially saponifying the mixture comprises saponifying the mixture sufficiently to result in a formulation that is, by weight, 60% to 90% saponified.

36. The method of claim 26, wherein the formulation is, by weight, 60% to 90% saponified.

37. The method of claim 26, wherein the weight ratio of capric acid to caprylic acid in the mixture ranges from 4:1 to 1:4.

38. The method of claim 26, wherein the weight ratio of capric acid to caprylic acid in the mixture ranges from 2:1 to 1:2.

39. The method of claim 26, wherein the formulation further comprises at least one of isopropyl alcohol, glycerin, water, potassium hydroxide, and potassium sorbate.

40. A method for controlling arthropods; the method comprising:
  applying an effective amount of the formulation of claim 1 to a desired host, surface area, or object.

41. The method of claim 40, wherein the formulation exhibits at least 90 percent repellency for 1.5 hours.

42. The method of claim 40, wherein the formulation exhibits at least 90 percent repellency for up to 3 hours.

43. The method of claim 40, wherein the formulation exhibits at least 90 percent repellency for up to 4 hours.

44. A method for controlling arthropods; the method comprising:
  applying an effective amount of the formulation of claim 7 to a desired host, area, or object.

45. The method of claim 44, wherein the formulation exhibits at least 90 percent repellency for 1.5 hours.

46. The method of claim 44, wherein the formulation exhibits at least 90 percent repellency for up to 3 hours.

47. The method of claim 44, wherein the formulation exhibits at least 90 percent repellency for up to 4 hours.

* * * * *